United States Patent
Kong et al.

(10) Patent No.: US 6,525,540 B1
(45) Date of Patent: Feb. 25, 2003

(54) METHOD AND DEVICE FOR DETECTION OF EM WAVES IN A WELL

(75) Inventors: Fan-Nian Kong, Oslo (NO); Harald Westerdahl, Dal (NO); Terje Eidesmo, Ranheim (NO); Svein Ellingsrud, Trondheim (NO)

(73) Assignees: Den Norske Stats Oljeselskap A.S., Stavanger (NO); Norges Geotekniske Institutt, Oslo (NO)

(*) Notice: Subject to any disclaimer, the term of this patent is extended or adjusted under 35 U.S.C. 154(b) by 0 days.

(21) Appl. No.: 09/719,639

(22) PCT Filed: Jun. 18, 1999

(86) PCT No.: PCT/NO99/00206
§ 371 (c)(1),
(2), (4) Date: Feb. 23, 2001

(87) PCT Pub. No.: WO00/00852
PCT Pub. Date: Jan. 6, 2000

(30) Foreign Application Priority Data

Jun. 18, 1998 (NO) .............................. 19982826

(51) Int. Cl.⁷ .................................................. G01L 3/30
(52) U.S. Cl. .................. 324/338; 324/333; 166/250.01; 175/40
(58) Field of Search ................................. 324/338, 339, 324/333, 334, 337; 175/40, 50; 166/250.01, 66, 66.5

(56) References Cited

U.S. PATENT DOCUMENTS

| | | | |
|---|---|---|---|
| 5,081,419 A | 1/1992 | Meador et al. | 324/338 |
| 5,233,304 A | 8/1993 | Hubans | 324/323 |
| 5,363,094 A | 11/1994 | Staron et al. | 340/854.6 |
| 5,732,776 A | 3/1998 | Tubel et al. | 166/250.15 |
| 5,860,483 A | 1/1999 | Havig | 175/40 |

*Primary Examiner*—Walter E. Snow
(74) *Attorney, Agent, or Firm*—Foley & Lardner

(57) ABSTRACT

A method for detecting electrical properties in a geological formation in a well which has within it a tubing string comprising the steps of mounting a transmitter antenna outside of the tubing string in a fixed position with respect to the geological formation, mounting a receiving antenna outside of the tubing string in a fixed position with respect to the geological formation, generating a first series of electromagnetic waves at a first time, receiving a first series of reflected electromagnetic waves in the receiver antenna, transforming the first series of reflected electromagnetic waves to form a first registration, generating a second series of electromagnetic waves at a second time, receiving a second series of reflected electromagnetic waves in the receiver antenna, transforming the second series of reflected electromagnetic waves to form a second registration, and comparing the registrations. Also disclosed is a device for accomplishing the method.

45 Claims, 28 Drawing Sheets

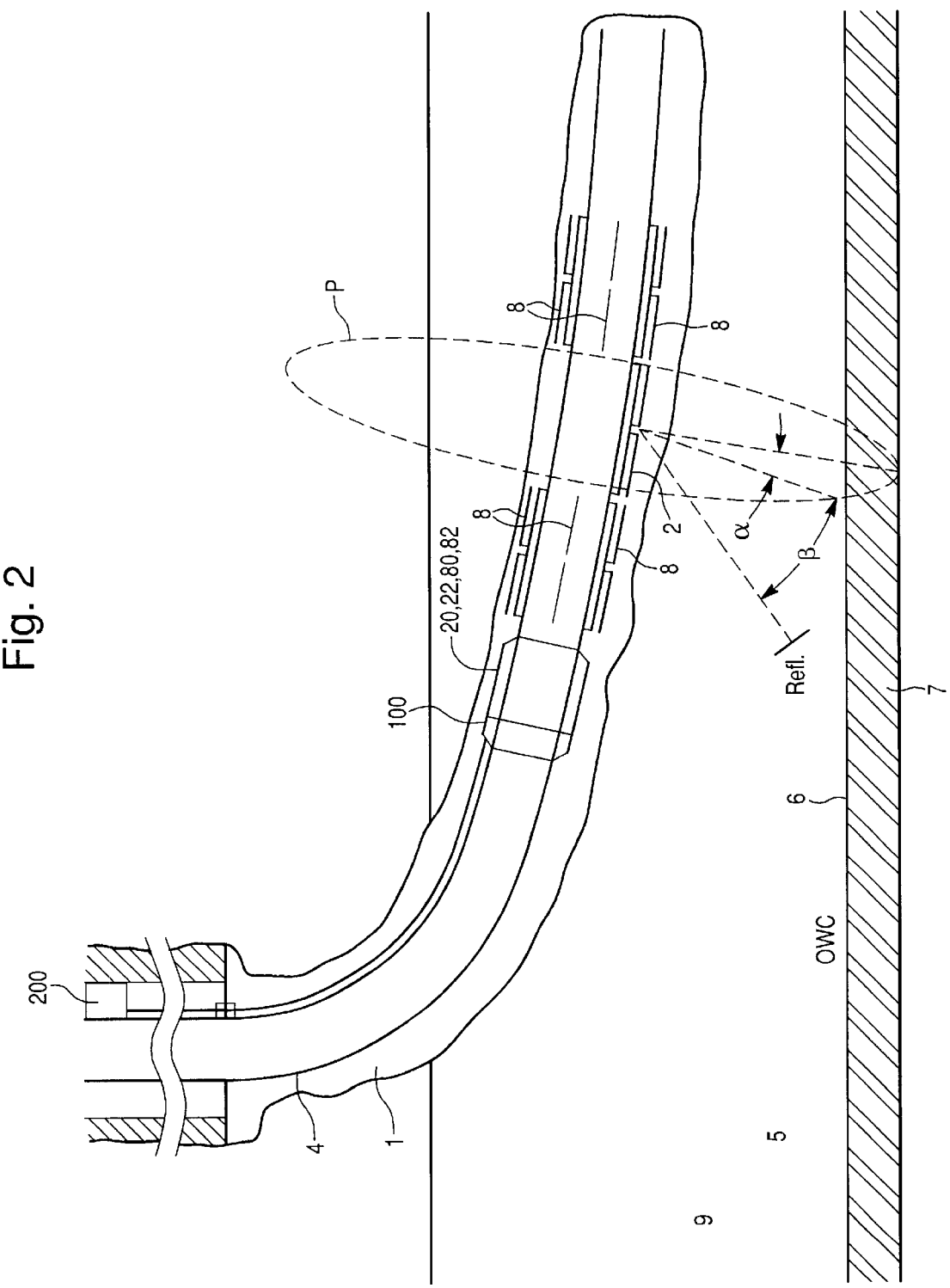

Fig. 2b
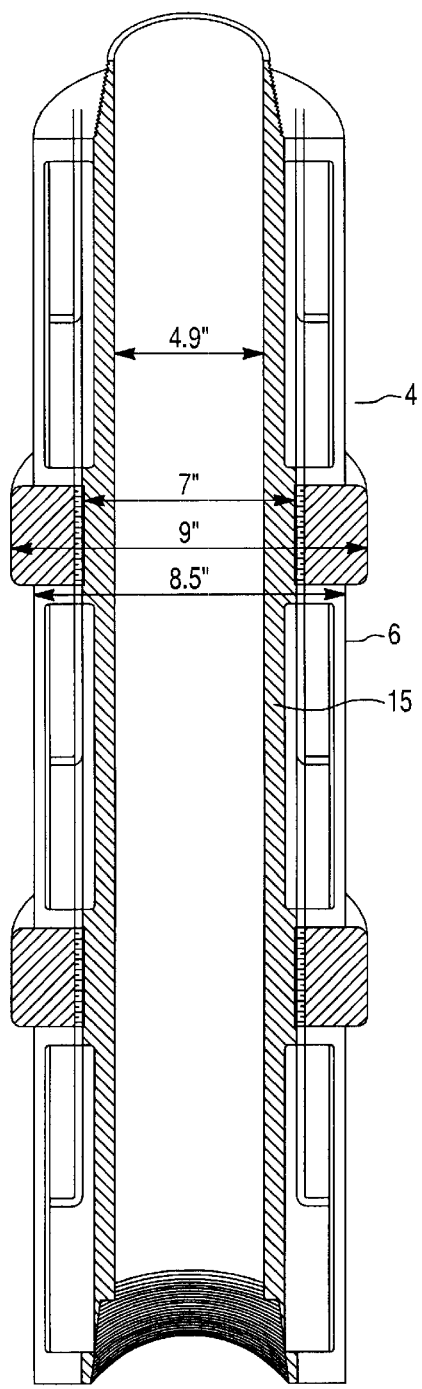
Fig. 2c
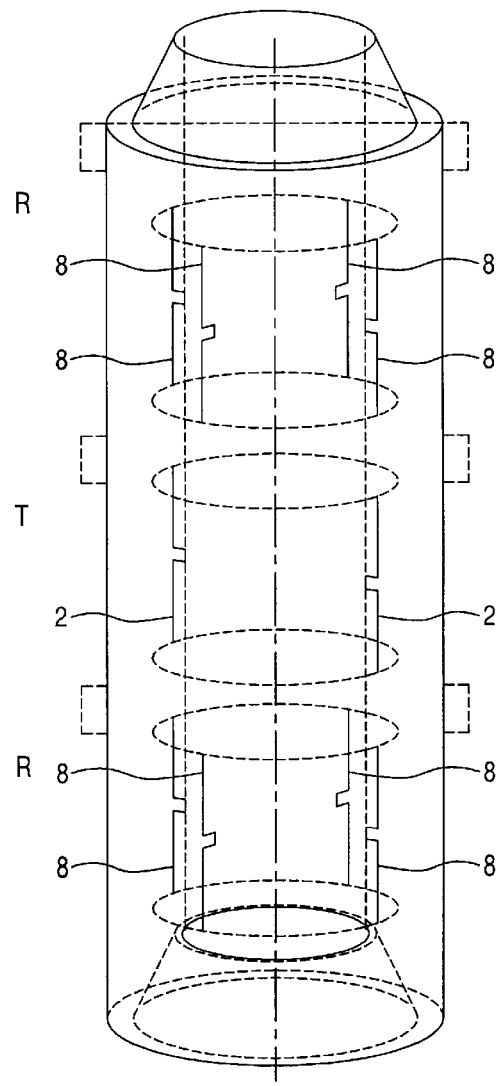
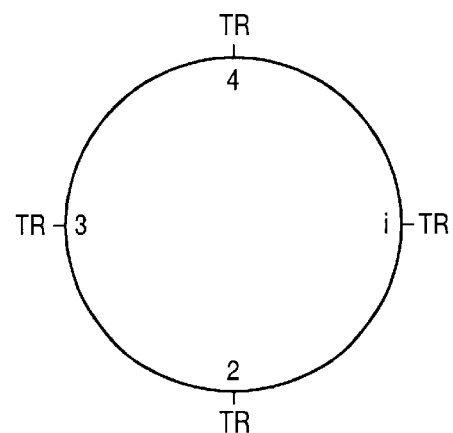

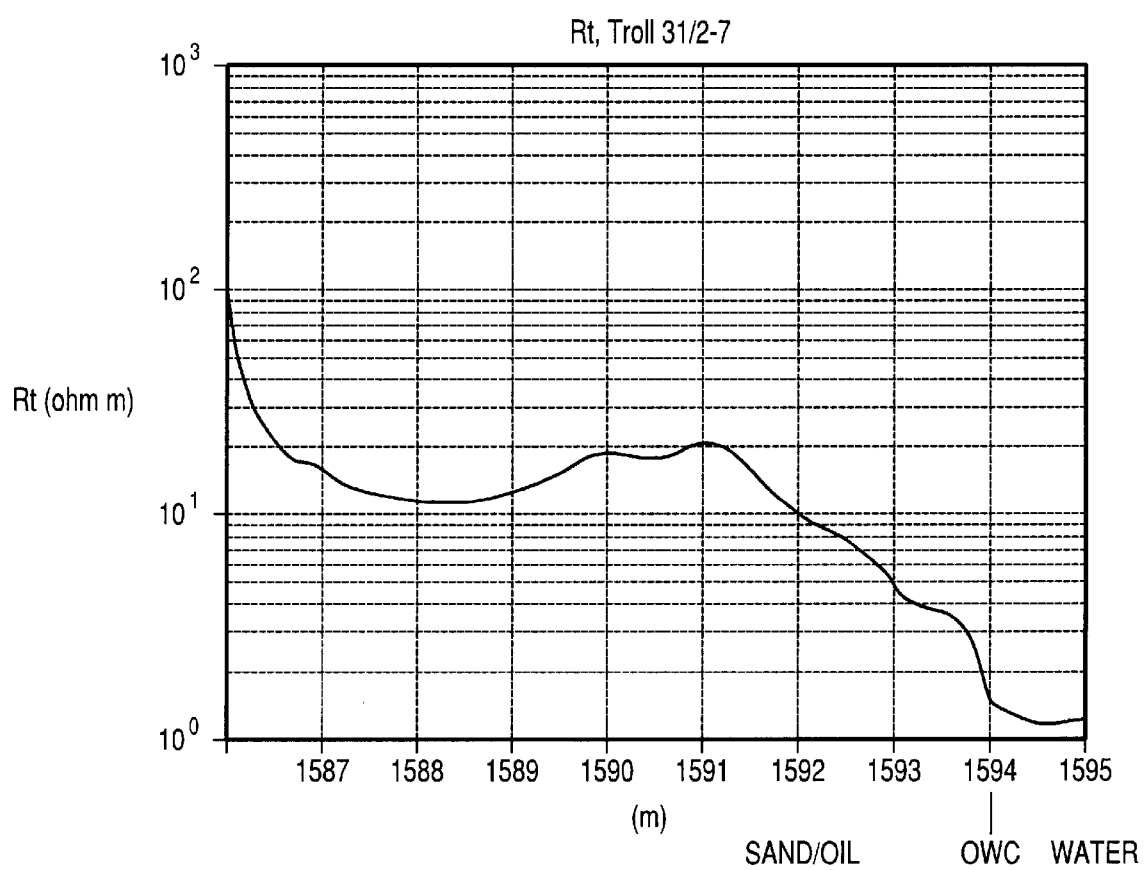

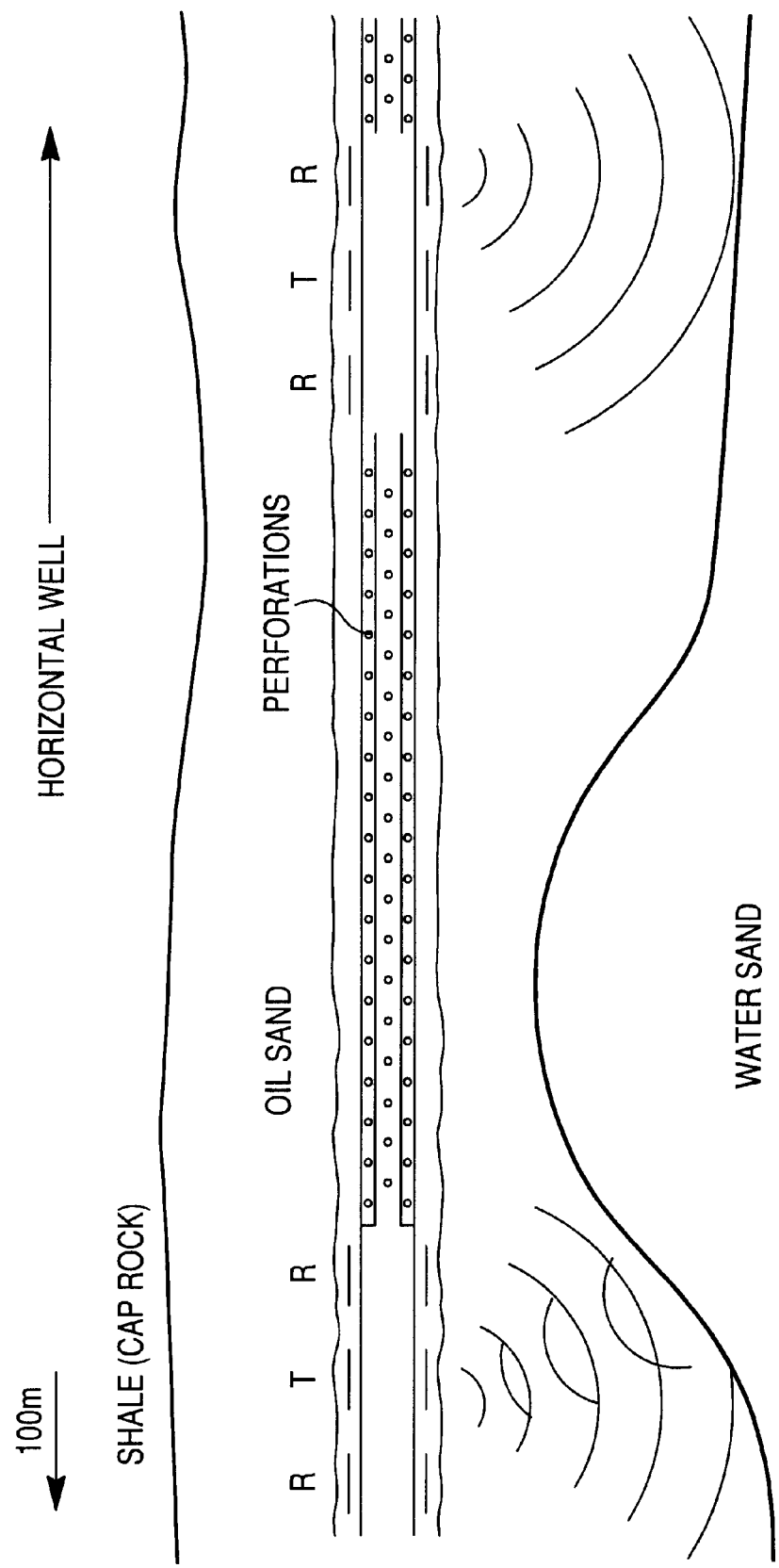

METHOD AND DEVICE FOR DETECTION OF EM WAVES IN A WELL

FIELD OF INVENTION

This invention relates to a method for using a radar-like device in production wells to detect the oil/water contact in a reservoir rock.

More specifically the invention comprises a method for using a transmitter antenna for electromagnetic waves which is fixedly arranged near a production tubing inside a geological formation, and receiver antennas which also are fixedly arranged near the production tubing, preferably by cement fixation in the well. This method and the application of the radar-like device may enable the user to detect reflectors constituted by electrically conducting surfaces inside the reservoir. Such a surface of particular importance is the oil/water contact, with the water front in most instances constituting a relatively sharp transition between oil filled sand with high resistivity, to water filled sand with low resistivity thereby constituting a reflector.

BACKGROUND OF THE INVENTION

Borehole logging tools utilizing the radar principle is known from U.S. Pat. Nos. 4,670,717, 4,814,768, 4,297,699, 4,430,653 and GB 2 030 414. Some of these patent use methods where it is necessary to estimate a wave propagation speed in order to be able to interpret the radar signals.

Schlumberger's U.S. Pat. No. 5,530,359, "Borehole logging tools and methods using reflected electromagnetic signals", describe a logging tool with pulsed radar signals being transmitted from a transmitter antenna in a separate vertical section. The logging tool is freely hanging in the borehole in a cable or in a coiled tubing. Linear antenna elements are applied, being arranged parallelly with the long axis z of the tool. Electromagnetic pulses are emitted with a center frequency of 40 MHz and a highest frequency component of 120 MHz. This pulse is emitted in all directions into the formation and reflected from structures in the formation back to the tool in the borehole. The transit time of the pulse out to the structure and back to the tool is used for determining the distance between the reflecting structure and the borehole. Directional information is obtained by the fact that receiver antennas are arranged around the entire circumference of the tool, so that one may find the direction to the reflecting structure by making differences between the reflected signals. These differences may be calculated by means of electronic circuits, or subtraction may be performed by directly differentially coupled receiver antennas. One method to calculate the reflected signals' direction is given. A disadvantage of Schlumberger's U.S. Pat. No. 5,530,359 is that the instrument applies pulsed electromagnetic waves. This entails a spread of the frequency components already in the emitted signal, and thus the emitted signal pulse exhibits a continuously varying group velocity. The reflected signal becomes smeared out and one gets an unclear image of the reflecting structures. Near reflecting structures will also dominate over more remote reflecting structures, so that the more remote structures barely can be detected if the nearer rocks have relatively high conductivity/low resistivity. Another disadvantage of Schlumberger's instrument is that it is not fixedly arranged by the geological formation, so that there is no provision for tracing changes in electrical parameters in the formation during a period of time, e.g. from one date to another. The instrument is also not arranged for being applied neither in production wells nor in injection wells.

Another apparatus is described in U.S. Pat. No. 5,552,786: "Method and apparatus for logging underground formations using radar", (Schlumberger). U.S. Pat. No. 5,552,786 describes a logging tool which partially solves the problem of the electromagnetic wave propagation speed in the formations which are to be logged. The apparatus emits an electromagnetic pulse in close contact with the borehole wall, into the formation and receives the direct wave in a predetermined distance along the drillstring from the transmitter. Thereby the wave propagation speed for the "direct wave" through the rocks (which may be invaded by drilling mud), and the reflectors separations from the emitter/receiver system may be calculated more exactly than if one had only an estimate of the wave propagation speed.

U.S. Pat. No. 4,504,833 "synthetic pulse radar system and method" concerns a synthetically pulsed radar which generates several signals of different frequencies simultaneously. The response from the subsurface to these different frequencies simulates parts of the Fourier spectrum which would have been measured if one emitted a very short pulse which according to the mathematical background would have been very broad in the frequency spectrum. However, the system is arranged to be used onboard a vehicle, among other things, because according to its claim 1, it shall be able to generate all the component signals simultaneously.

U.S. Pat. No. 4,275,787 "Method for monitoring subsurface combustion and gasification processes in coal seams" describes a radar for detecting a combustion front in a geological formation, e.g. a coal bearing formation. Due to the resistivity generally increasing with the temperature, such a combustion front will provide high resistivity and constitute a very large contrast in relation to the coal bearing formation which normally will show low resistivity.

The attenuation exceeds loo dB/wavelength in the combustion front, and the attenuation of "Pittsburgh coal" is 1 dB/wavelength, for "British coal" the attenuation is 3 dB/wavelength. The applicant (of U.S. Pat. No. 4,275,787) mentions that a detection range for the combustion front is 100 m, an unrealistically long distance when one takes into consideration the conditions in an oil well where the attenuation of the signal is much higher and where it is a very difficult task to detect reflecting surfaces only one to two metres out in the reservoir. A swept signal is emitted and which varies continuously between a lowest and a highest frequency. Because the combustion front is moving, one may by subtraction of the received signals be able to see a change in the difference signal between the observations. However the patent does not take into consideration the need for tuning of the transmitter antennas when the transmitter antennas are lying very close (e.g. within a few millimeters) to a metallic pipe surface (e.g. liner pipe or completion pipe) and the frequency of the emitted signal is changed.

The methods and tools in the known art do not solve the problems arising in the context of petroleum production on the Troll oilfield in the North Sea as described herein, data from the Troll oil field indicate that the resistivities in the actual geological formations are relatively lower with respect to the conditions described in the known art, and therefore it is impractical to perform detection by means of electromagnetic waves by means of the known art.

BRIEF SUMMARY OF THE INVENTION

A preferred embodiment of the present invention comprises a method for detecting electrical properties in a geological formation via a well which has within it a tubing string, comprising the steps of mounting a transmitter antenna outside the tubing string in the well in a fixed position with respect to the geological formation, mounting a receiving antenna outside the tubing string in a fixed position with respect to the geological formation, generating a first series of electrical signals to cause the transmitter antenna to emit a first series of electromagnetic waves at a first time, receiving a first series of reflected electromagnetic waves in the receiving antenna, transforming the first series of reflective electromagnetic waves into a first registration, generating a second series of electrical signals to cause the transmitter antenna to emit a second series of electromagnetic waves, receiving a second series of reflective electromagnetic waves in the receiver antenna, transforming the second series of reflective electromagnetic waves into a second registration. An alternative to this embodiment of the present invention comprises forming a difference between the first and second registrations to indicate a change in electrical properties between the first and second times. A further alternative to this embodiment comprises interpreting the change in electrical properties as representing a change or a displacement of a liquid horizon.

Another preferred embodiment of the present invention comprises a device for detecting electrical properties in a geological formation via a well containing a tubing string, comprising a transmitter antenna for emitting electromagnetic waves configured to be positioned on or near the tubing string and mounted in a fixed position with respect to the geological formation, and a receiver antenna for receiving reflected electromagnetic waves configured to be positioned on or near the tubing string and mounted in a fixed position with respect to the geological formation. In an alternative to this embodiment, the receiver antenna is a directionally sensitive antenna group comprising three or more receiver antennas configured to be positioned about the tubing string center line axis at a position along the length of the tubing string, and capable of detecting the direction of reflected electromagnetic waves and the direction to electromagnetic wave reflectors with respect to the tubing string axis. In a further alternative to this embodiment, the transmitter antenna comprises a transmitter antenna group comprising two or more transmitter antennas configured to be positioned about the tubing string center line axis at a position along the length of the tubing string, and capable of emitting electromagnetic waves generally in a selected direction with respect to the tubing string axis. In a further alternative to this embodiment, a transmitter antenna group is positioned between two directionally sensitive antenna groups. A further alternative to this embodiment includes an electronics package comprising a signal generator for generating electrical signals to the transmitter antennas, devices for receiving signals induced in each receiver antenna, signal processing devices for processing the received signals, and communication devices for transmitting processed signals and for receiving control signals.

BRIEF DESCRIPTION OF THE DRAWINGS

The invention will be described in detail in the paragraphs below, with non-limiting examples of preferred embodiments of the invention, with reference to the accompanying figures of the non-limiting examples.

FIG. 2 displays a schematic illustration with an embodiment of the invention being positioned on or near a production tubing.

FIG. 2b illustrates a section of a preferred embodiment of the invention, as a module comprising transmitter and receiver antennas and which may enter as an ordinary screw-threaded part of the completion in the production zone.

FIG. 2c displays in perspective view the module of FIG. 2b, having outer conical threading at the top and corresponding inner conical threading in the lower part.

FIG. 10 illustrate several devices according to the invention in a perforated horizontal production well.

DETAILED DESCRIPTION OF THE PREFERRED EMBODIMENT

Expected Resistivity

Figure 3A:
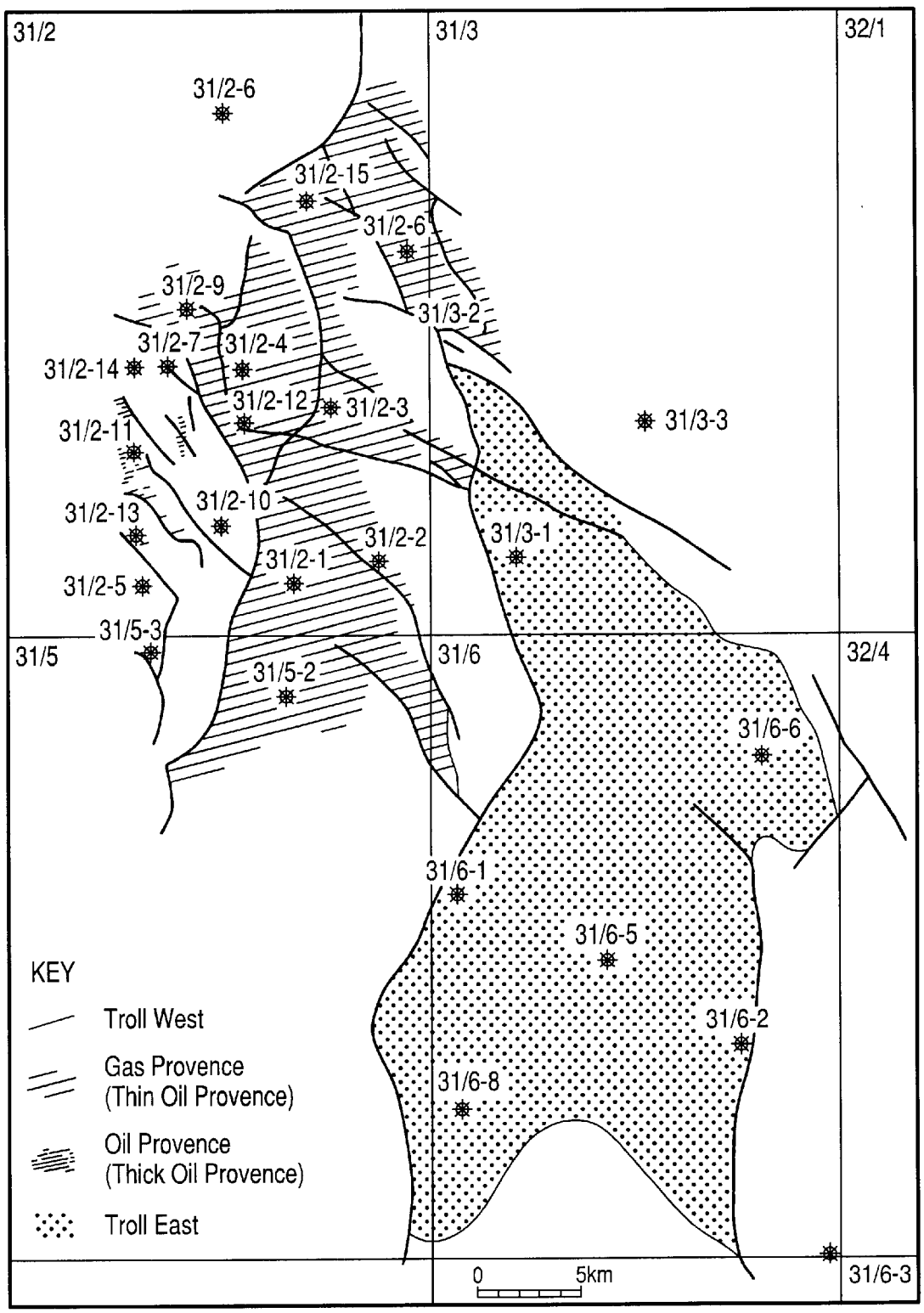
FIG. 3a displays a map over license blocks on the Troll oilfield in the North Sea, and FIGS. 3b, 3c, 3d, 3e and 3f display logs of resistivity as a function of depth in five vertical boreholes in the Troll oilfield.
Figure 3B:
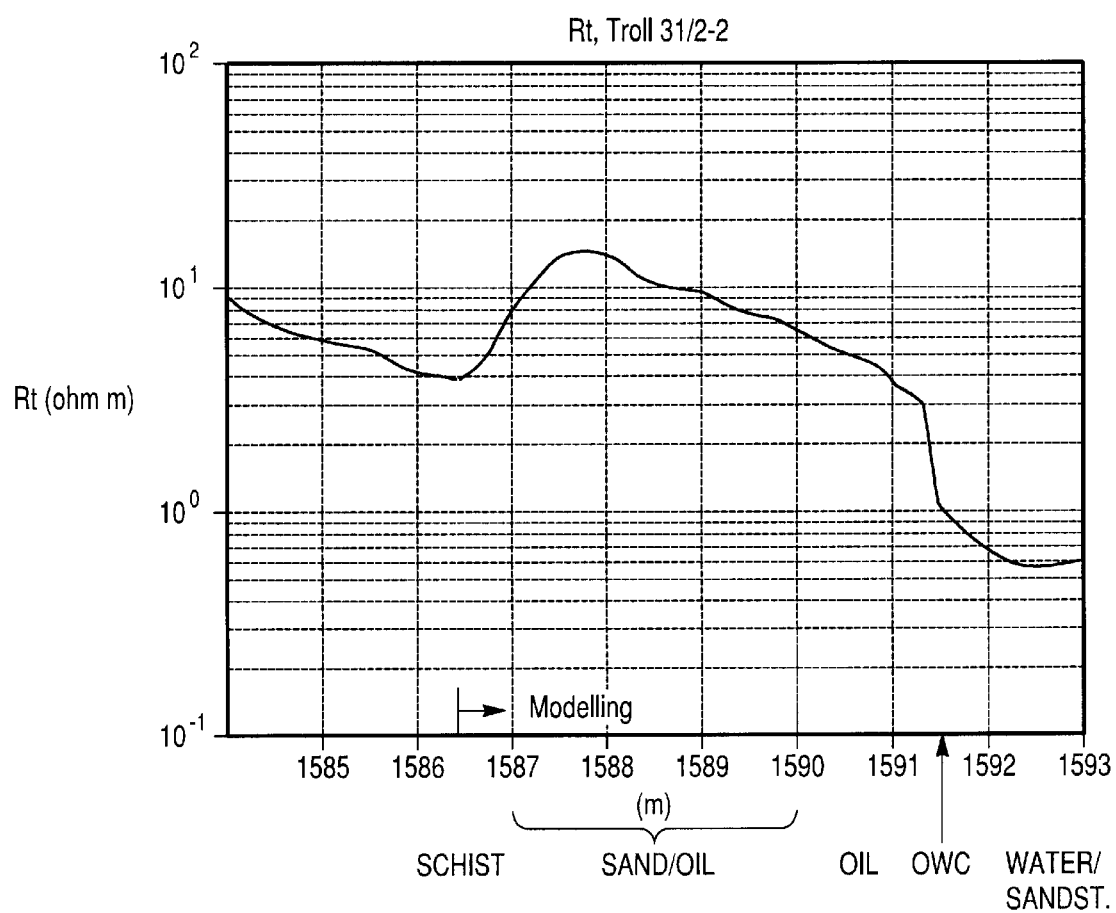
Figure 3C:
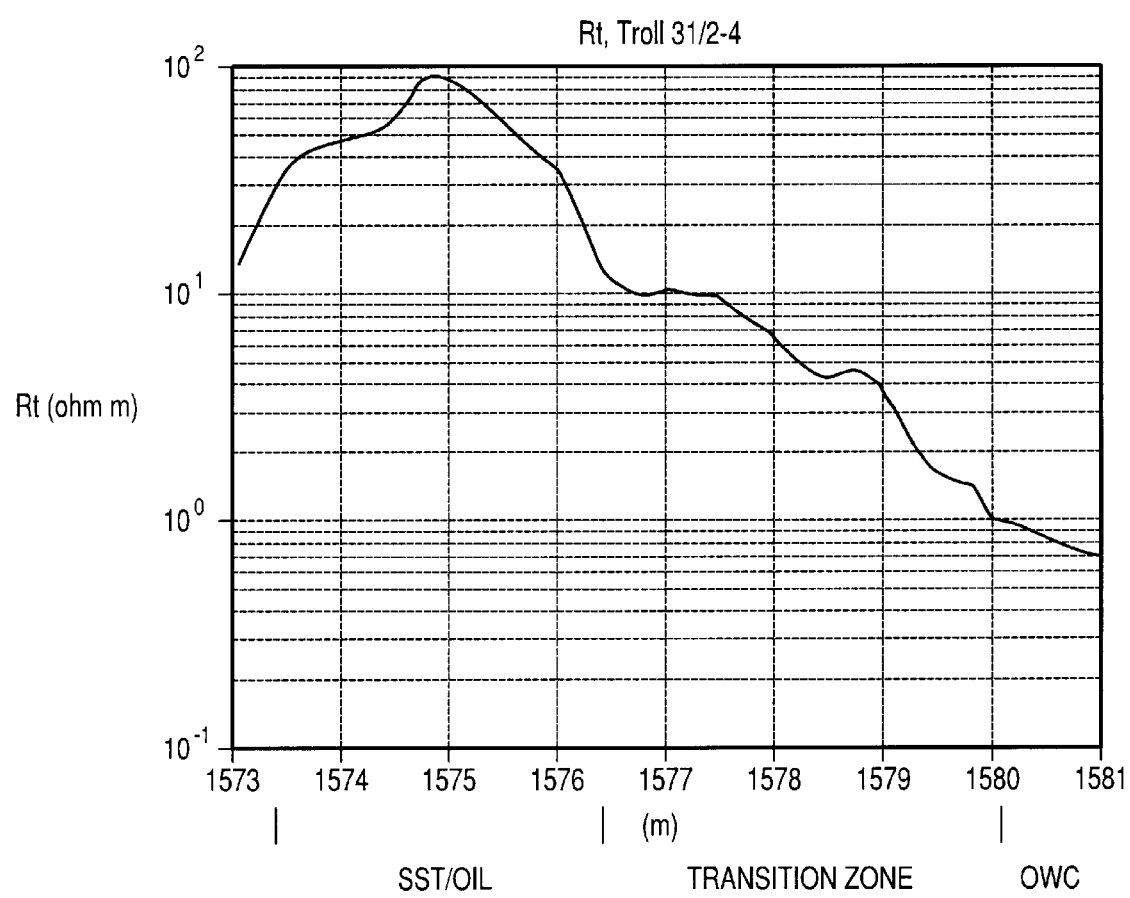
Figure 3D:
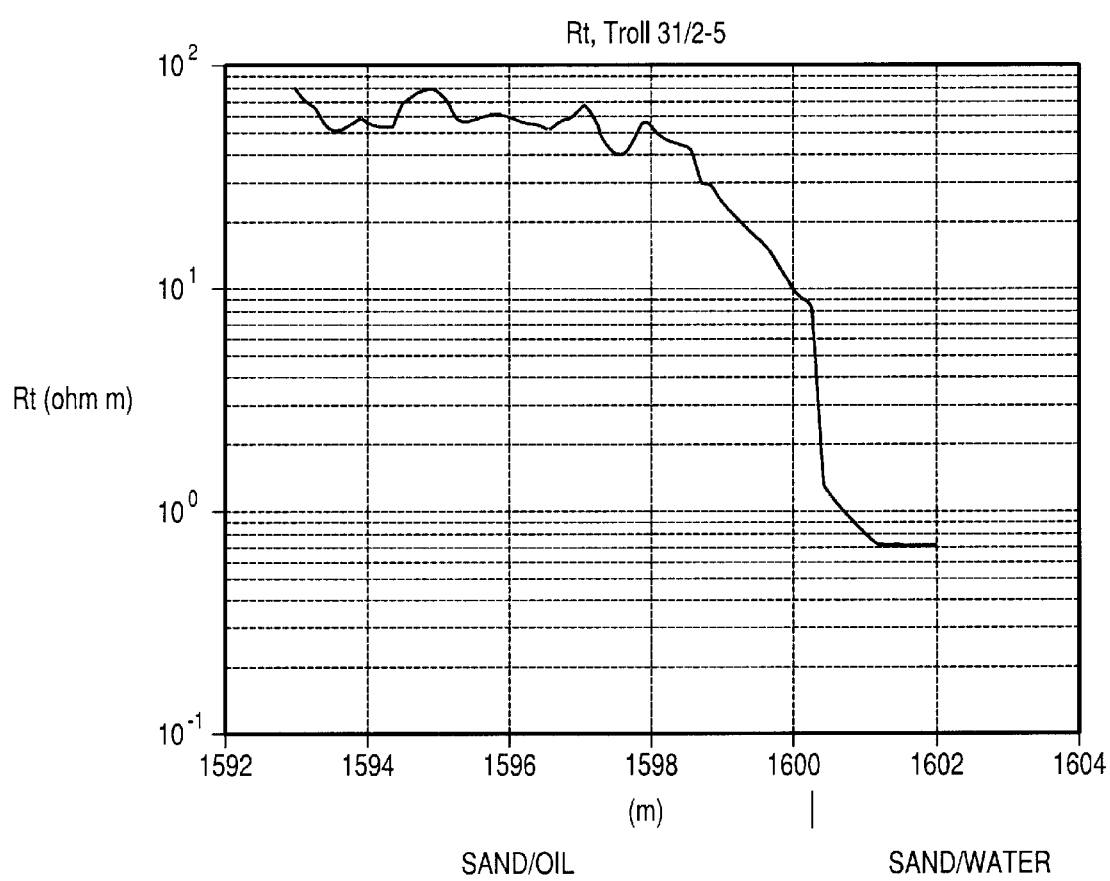
Figure 3E:
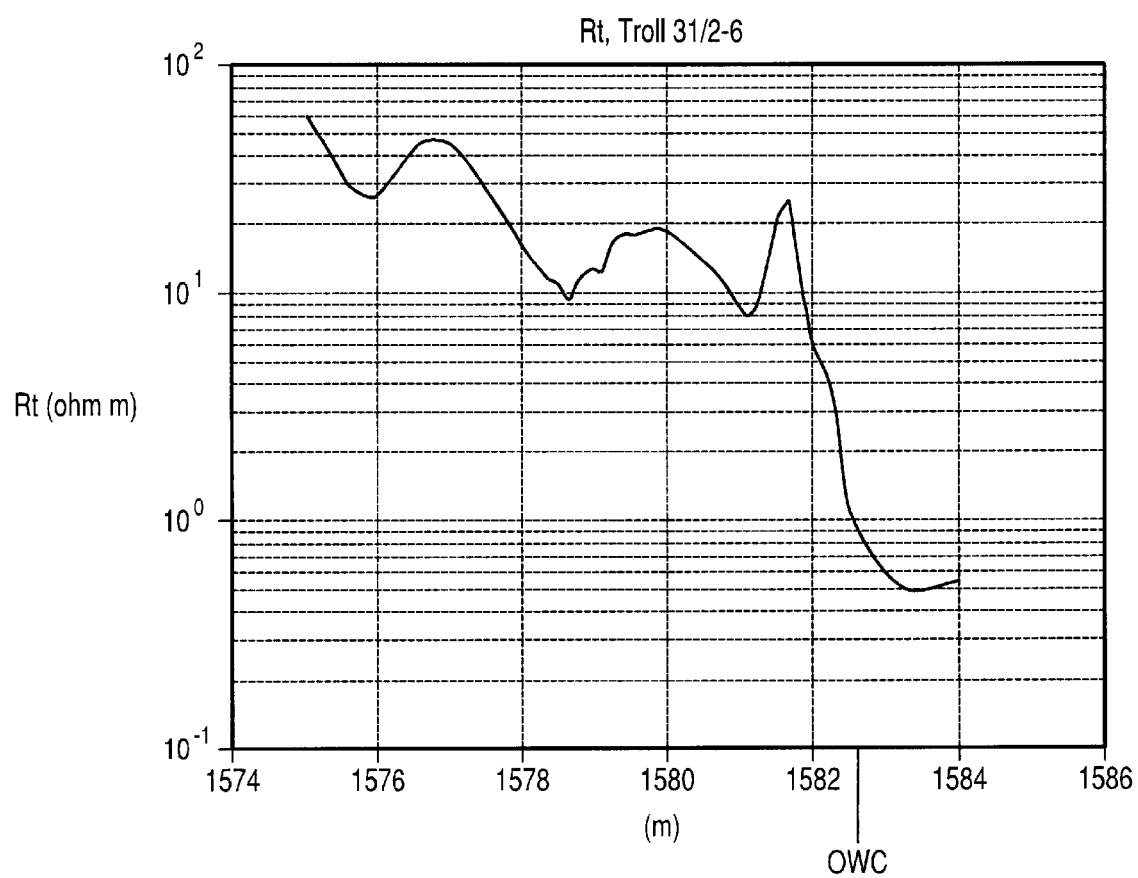

A map over the Troll oilfield, generally covering the license blocks 31/2, 31/3, 31/5 and 31/6, is shown in FIG. 3a. Resistivity data are available from five wells: 31/2-2 (FIG. 3b), 31/2-4 (FIG. 3c), 31/2-5 (FIG. 3d), 31/2-6 (FIG. 3e), and 31/2-7 (FIG. 3f). The graphs display resistivity in $\Omega$m as a function of logging depth in mainly vertical boreholes through the reservoir rocks. The oil/water contact, hereafter called "OWC" is defined in the wells at the depths indicated in the respective figures. The distribution of resistivity with respect to depth is markedly different from well to well. In 31/2-2 the resistivity R varies between 3 $\Omega$m and 13 $\Omega$m over the OWC, while R in well 31/2-4 decreases from 100 $\Omega$m to 1 $\Omega$m over the OWC. In well 31/2-5 the resistivity varies between 40 $\Omega$m and 80 $\Omega$m before it starts to decrease in a monotonous way, about 1 meter above the OWC. At the OWC the resistivity R falls to about 7 $\Omega$m. The development in well 31/2-6 is characterized by a relatively strong ripple between 8 $\Omega$m and 14 $\Omega$m, even though the decrease of resistivity is clear at the OWC. Well 31/2-7 has a low and relatively less varying R in the area between 7 meters above the OWC and down to the OWC, with a maximum of 2 $\Omega$m and is evenly falling to 0.4 $\Omega$m just before the OWC.

The resistivity graphs show that local variations in R may be much larger than the drop in R which takes place at the OWC. Because the conductivity in the formations generally arise from salt water in the pore spaces or conductive schists, local variations may be due to varying reservoir quality embodied by a combination of clay mineral content and porosity. Parameters like local lithology, texture, facies and excess pressure will also affect the resistivity. Resistivity tools are generally quite exact and give repeatable measurements. Generally the depth resolution is small, about 10 cm. per measurement point, and the logs are smoothed to a certain degree due to the contact assembly of the instrument, so that the local formation resistivity will vary more than what is shown by the logs.

Expected Dielectric

No dielectric logs from the Troll oilfield are available. Here, dielectric data based on estimates of the known dielectric properties in sandstone, oil and water are applied. We select $\epsilon_{rock}$=7. When $\delta$ is 0.20 (20% porosity) then $\epsilon_{ro}$=5.82, showing that $\epsilon_{ro}$=6 is a reasonable estimate for the dielectric constant for oil saturated sandstone.

Figure 4A:
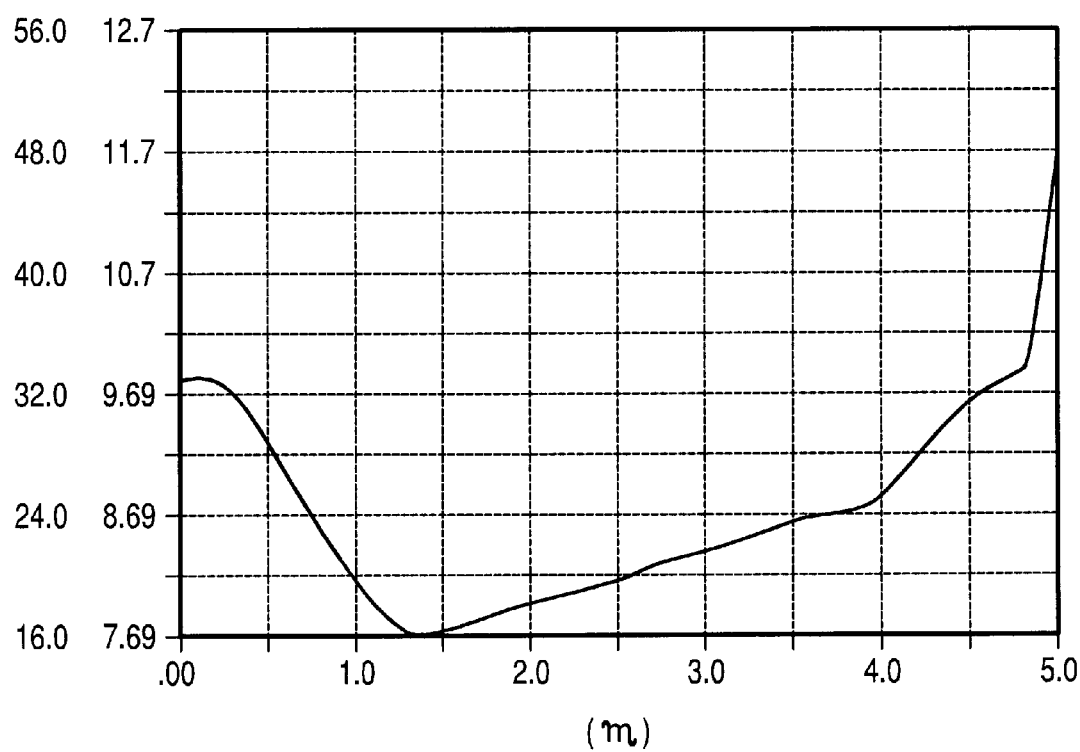
FIGS. 4a, 4b, 4c, 4d and 4e display estimated distributions of relative dielectric values based on water saturation in a 5 meter transition zone over the oil/water contact in the same wells as FIGS. 3b–3f. The scales have 13 as their highest value, indicating full water saturation in a 20% porous rock.
Figure 4B:
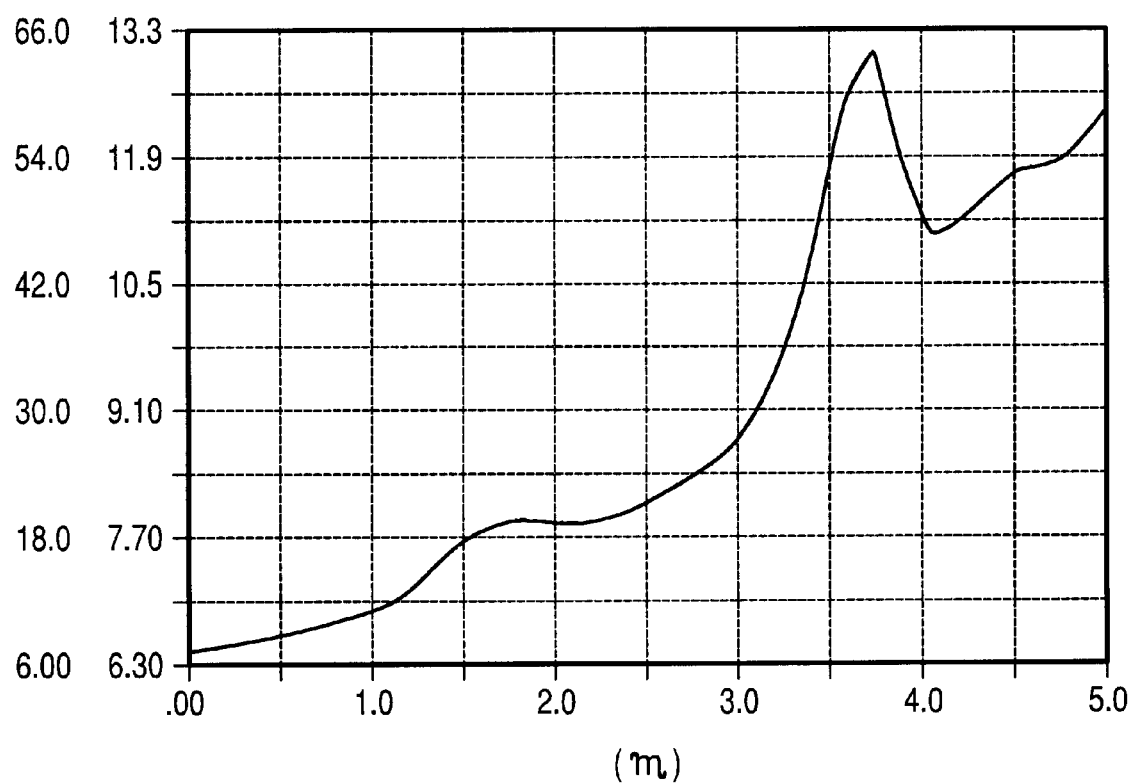
Figure 4C:
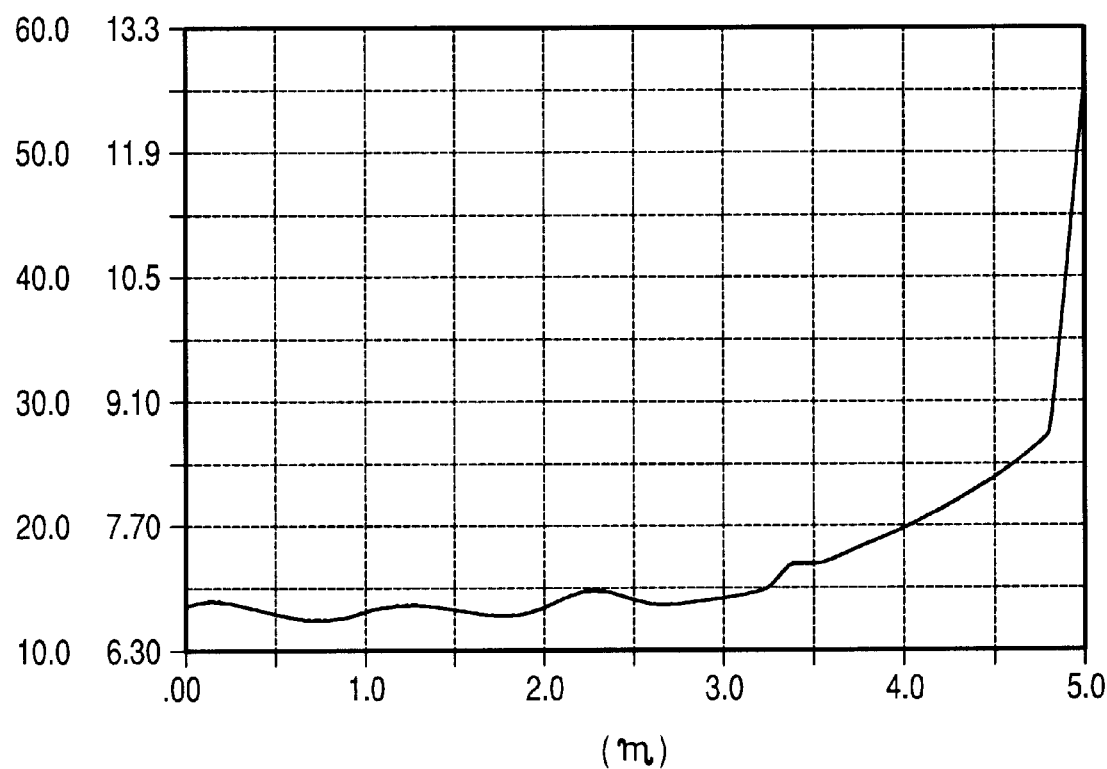
Figure 4D:
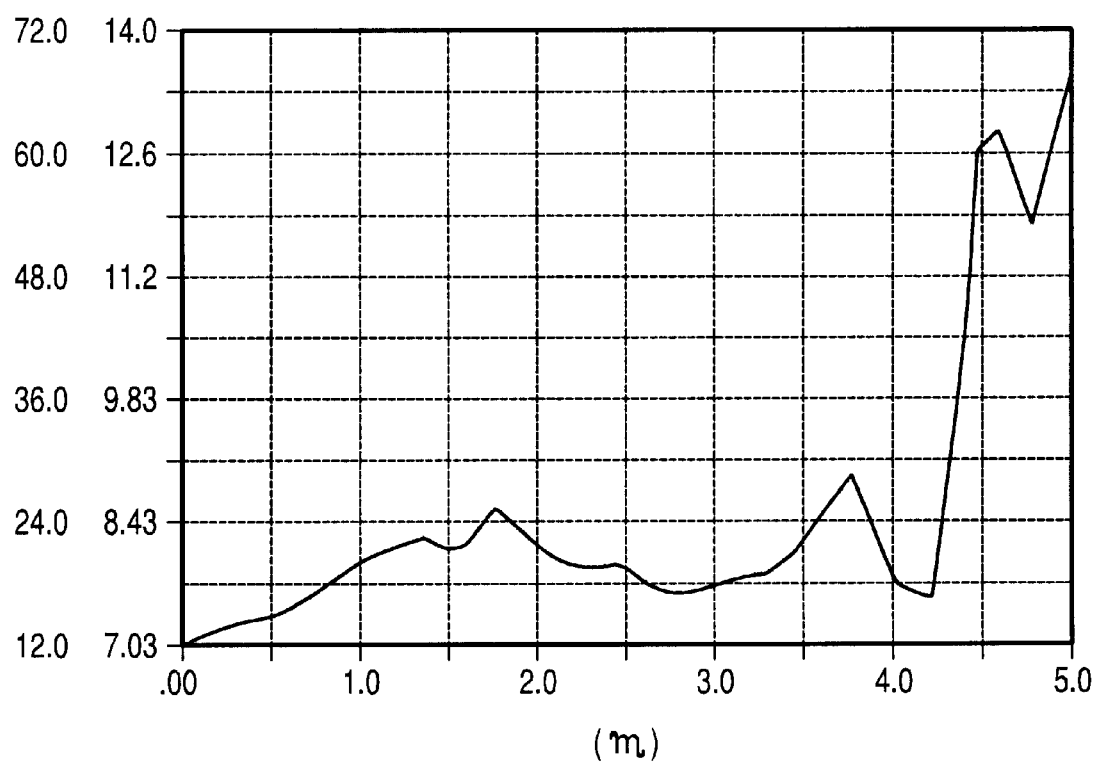
Figure 4E:
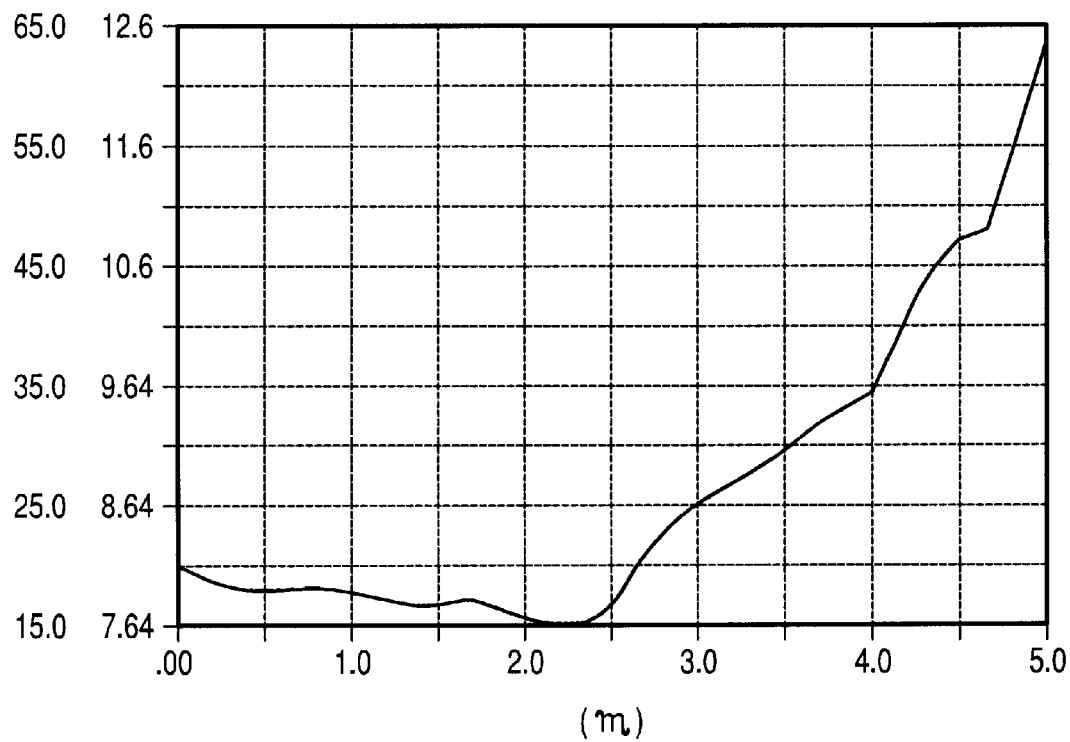

The dielectric constant for sea water, $\epsilon_{water}$=80 (King & Smith, 1981) at the frequencies actual for application in connection with this invention. The dielectric constant in water saturated sandstone is $\epsilon_{rw}$=13. FIGS. 4a, b, c, d and e show estimated distributions of relative dielectric values based on the water saturation of a 5 meters transition zone over the OWC in the same wells as for the FIGS. 3b–f. The scale indicating the relative dielectric constant, ranges from about 6 to about 13.

Wave Propagation in a Conductive Transition Zone

Figure 5A:
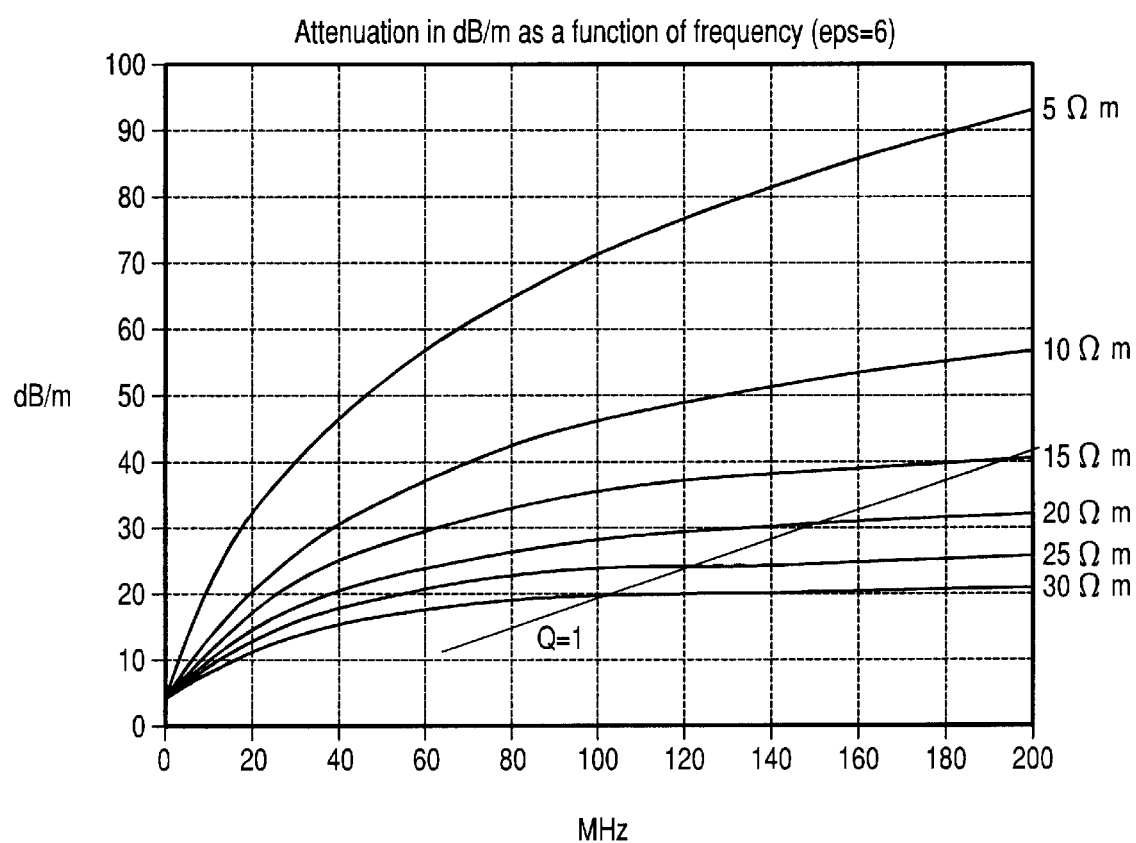
FIG. 5a displays theoretical graphs of electromagnetic waves' attenuation as a function of frequency between 1 MHz and 200 MHz for rocks with various conductivity or resistivity.
Figure 5B:
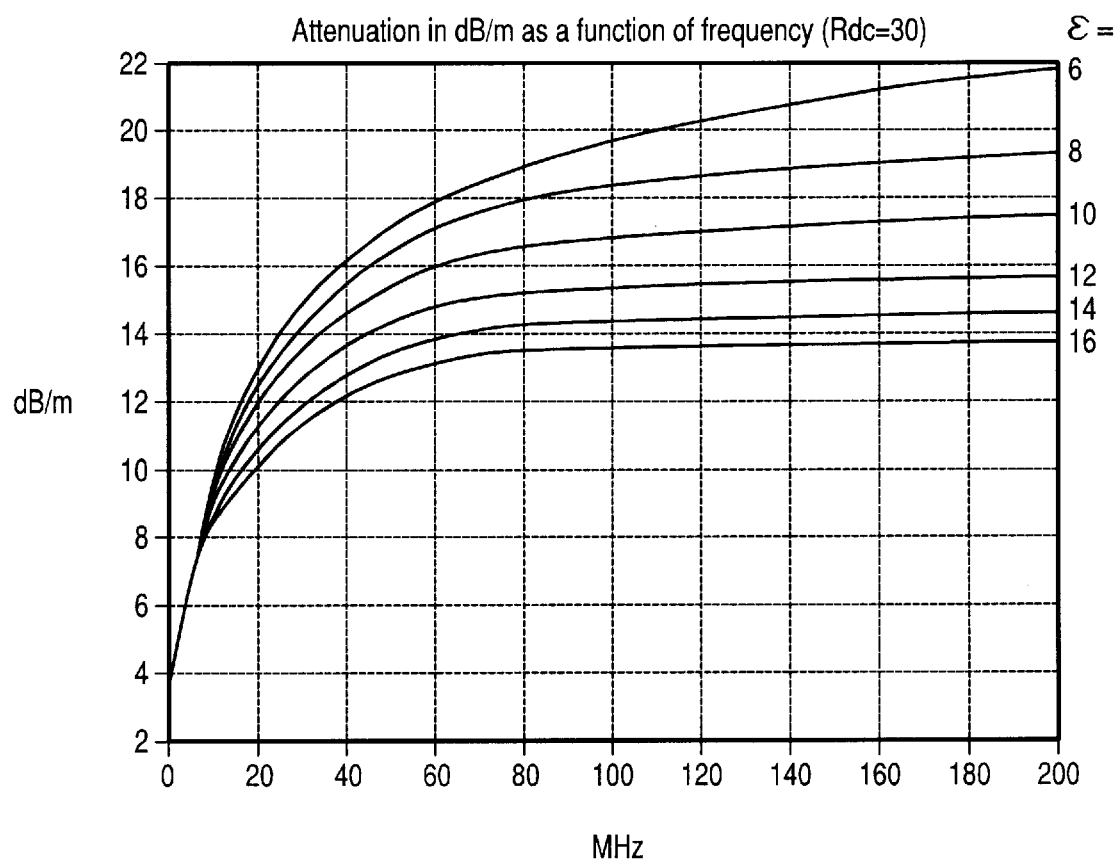
FIG. 5b displays theoretical graphs of electromagnetic waves' attenuation as a function of frequency between 1 MHz and 200 MHz for rocks with various dielectric constants.

FIG. 5a displays an attenuation graph of electromagnetic waves in the frequency range between 1 MHz and 200 MHz. $\epsilon_r$=6 and the resistivity $R_{DC}$ is varied in steps of 5 $\Omega$m from 5 $\Omega$m to 30 $\Omega$m. The rocks become more "transparent" for electromagnetic radiation the higher the resistivity is. FIG. 5b with the same frequency range displays graphs for constant $R_{DC}$=30 $\Omega$m and with $\epsilon_r$ varying from 6, 8, 10, 12, 14 to 16. One will see that the dielectric constant has less influence on the attenuation than the resistivity. The figures show that the attenuation is more than 10 dB/m for 30 $\Omega$m and frequencies above ca. 12 MHz. Attenuation above 10 dB/m will result in more than 100 dB attenuation for a return ray from a reflector being 5 meters away.

Figure 5C:
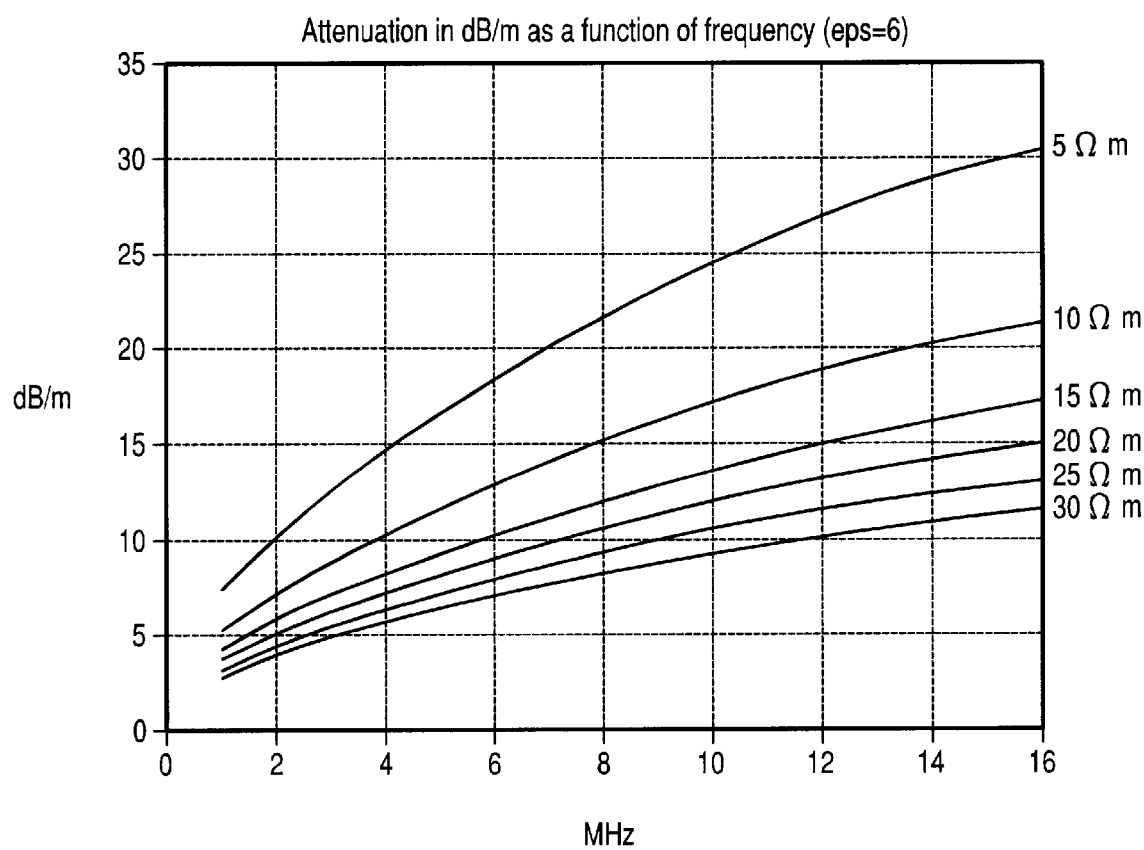
FIG. 5c displays the same as FIG. 5a, but narrowed to a frequency range between 1 and 16 MHz.
Figure 5D:
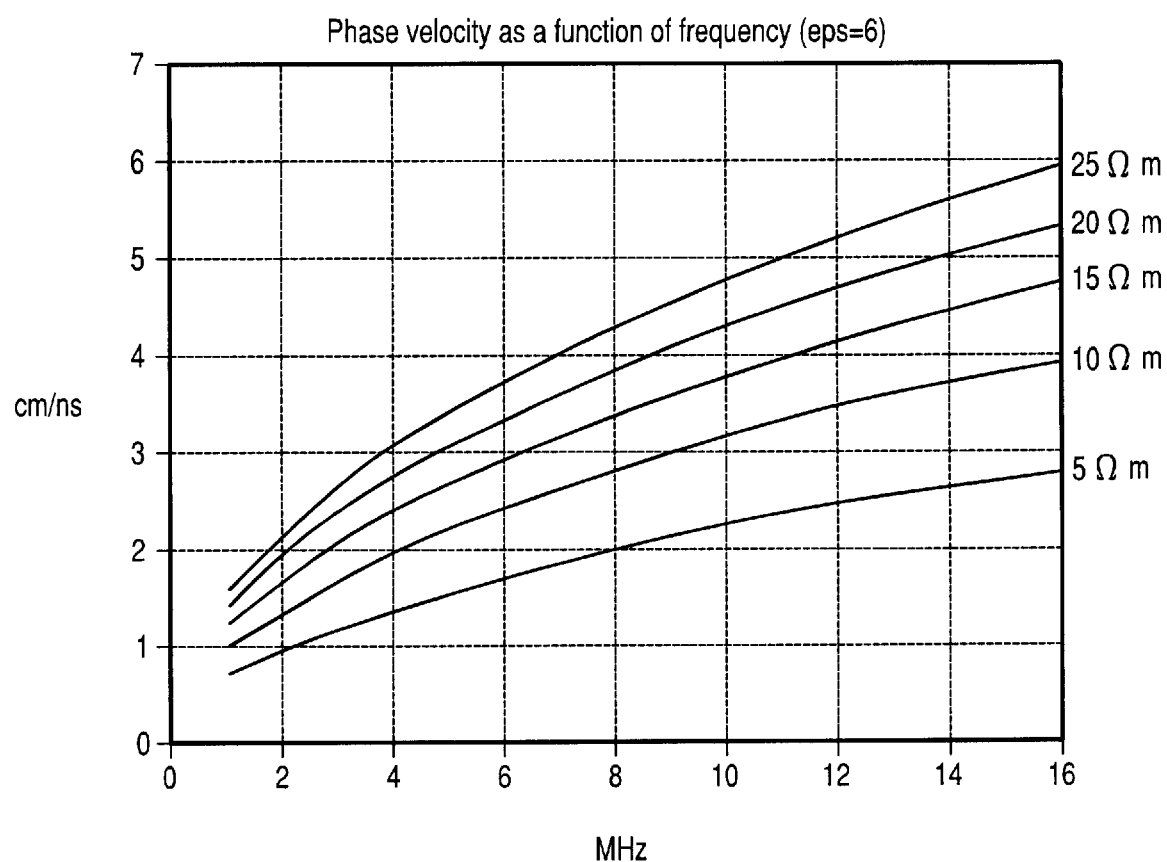
FIG. 5d displays theoretical graphs of phase velocity as a function of frequency between 1 and 16 MHz.

FIG. 5c displays an enlarged section of the frequency range from FIG. 5a, between 1 and 16 MHz. The attenuation is still high for resistivities lower than 10 $\Omega$m even in this low frequency range. FIG. 5d display the waves' phase velocities as a function of frequencies between 1 and 16 MHz. Within the 1 to 16 MHz frequency band the phase velocity varies strongly with resistivity, which may result in strong dispersion of an electromagnetic signal with a wide frequency content.

Reflection, Backscattering

All horizons in the well with electromagnetic resistivity contrast will result in reflections. Particles with higher conductivity, e.g. metal oxides, will incur dispersion of the electromagnetic waves. Near horizons will be detected more strongly than remote horizons if the resistivity contrast is the same, due to approximately spherical geometrical dispersion. This means that the reflexes from the resistivity contrast by the OWC may be masked behind numerous strong reflexes from local resistivity contrasts in the sandstone in the oil zone above the OWC. As an example, the resistivity contrasts represented by the gradients in R at 1578 meters and by 1580.5 meters depth in FIG. 3e will give strong reflexes initially not being different from the reflex from the OWC.

A purpose of this invention is to provide a system to measure the depth of the oil/water contact or the gas/water contact in a petroleum reservoir by means of electromagnetic waves.

Another purpose is to bring forward an instrument arranged to register and map the distribution of resistivity in the petroleum reservoir surrounding the well, to apply these resistivity measurements in geological interpretations of the reservoir.

The above mentioned problems may be solved by means of the present invention, which is a method for radar detection in a well (1) in a geological formation (9) comprising the following steps:

i) arrangement of at least one transmitter antenna (2) in a fixed position and direction in the well (1) with respect to the geological formation (9);

ii) generating a first series of electrical signals (25) to a transmitter antenna (2) and emission of a first series of electromagnetic waves (26$_1$) from the transmitter antenna (2) at a first time ($t_1$);

iii) reception of a first series of reflected electromagnetic waves (85$_1$,85$_2$, . . . , 85$_n$) by at least one, preferably several receiver antennas (8$_1$,8$_2$, . . . , 8$_n$), and transformation of the first series of reflected electromagnetic waves preferably to digital registrations ($S_1$);

iv) generating a second series of electric signals (25) to the transmitter antenna (2) and emission of electromagnetic waves (26$_2$) from the transmitter antenna (2), still in the same position and direction in the well (1), at a later point of time ($t_2$), with the time difference $t_2$–$t_1$ typically being several hours, days or longer time;

v) reception of a second series of reflected electromagnetic waves (85$_1$,85$_2$, . . . , 85$_n$) by the receiver antennas (8$_1$,8$_2$, . . . , 8$_n$), and transformation of the second series of reflected electromagnetic waves preferably to digital registrations ($S_2$).

A further embodiment of the present invention comprises a device for radar detection in a well in a geological formation, comprising, (a) at least one transmitter antennas for emission of electromagnetic waves, attached near a tubing string, being configured for fixed mounting with respect to the geological formation, and (b) at least one, preferably several receiving antennas for reflected electromagnetic waves, near preferably the first string of pipes, and which is also configured for fixed emplacement with respect to the geological formation.

Additional features of the invention are given by the dependent claims.

The Well

Figure 1:
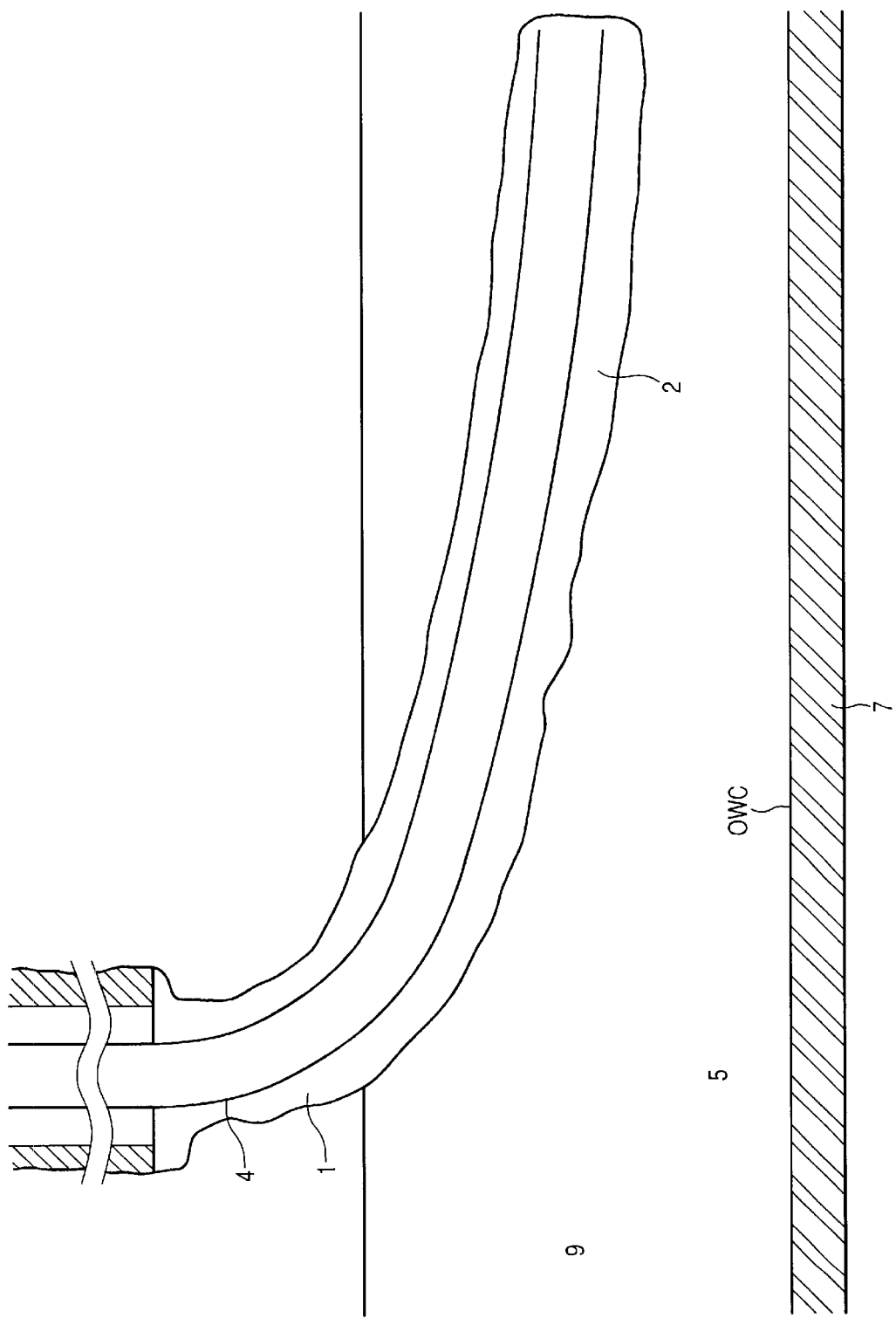
FIG. 1 is a cross sectional view of a production well with production tubing in a geological production zone for petroleum fluids, with oil or gas above in the production zone, and water below.

FIG. 1 shows a production well or a borehole 1 in a geological formation, which may be situated onshore or below the seabed. Usually there will be inserted a steel casing in several sections down in the drilled hole from the seabed and down to the top of the formation producing petroleum fluids as oil or natural gas. The producing formation may be without casing pipe, a so-called open completion, or have a casing made in composite material being transparent to electromagnetic waves. In a preferred embodiment of this invention one will not set a casing pipe in the production zone, but perform a cementing-in of a production pipe in the well 1. The geological formation comprises in this connection a reservoir rock, e.g. a porous, permeable sandstone formation 9. The borehole 1 may be more or less deviation drilled and is displayed in the figure as a near-horizontal borehole 1 even though the invention may be applied in boreholes with all deviation angles from the vertical direction downwards, between 0 and 180 degrees. A production tube 4 is arranged for completion of the production well or borehole. The production pipe's 4 diameter may be 7" in a 8½" borehole 1. A lining pipe (not shown) is usually arranged outside the production pipe 4. The lining pipe may be cemented and perforated, or consist of a fine mesh retaining sand and letting through oil, gas and water. A preferred embodiment of the invention will be applied in a nearly horizontally drilled well I in a sandstone formation 9. An oil/water contact OWC constitutes the interface between the substantially oil saturated sandstone 5 and water saturated sandstone 7. This invention may also be applied in an injection well or in an observation well. The fixed arrangement of the antennas by the geological formation may in one embodiment take place by cementing, implying that possible fluid flow between the antenna and the formation is brought to a halt, and that the wellstream thus possibly must take place inside the well tubing. By bringing the wellstream between the antenna and the geological formation to a halt, changing electromagnetic properties of the fluid in the wellstream will not disturb the emitted or received electromagnetic signals. Due to the legibility of the drawings it is not indicated that the antenna and the tubing may be entirely or partially cemented-in along the well.

The Method According to the Invention

Figure 7:
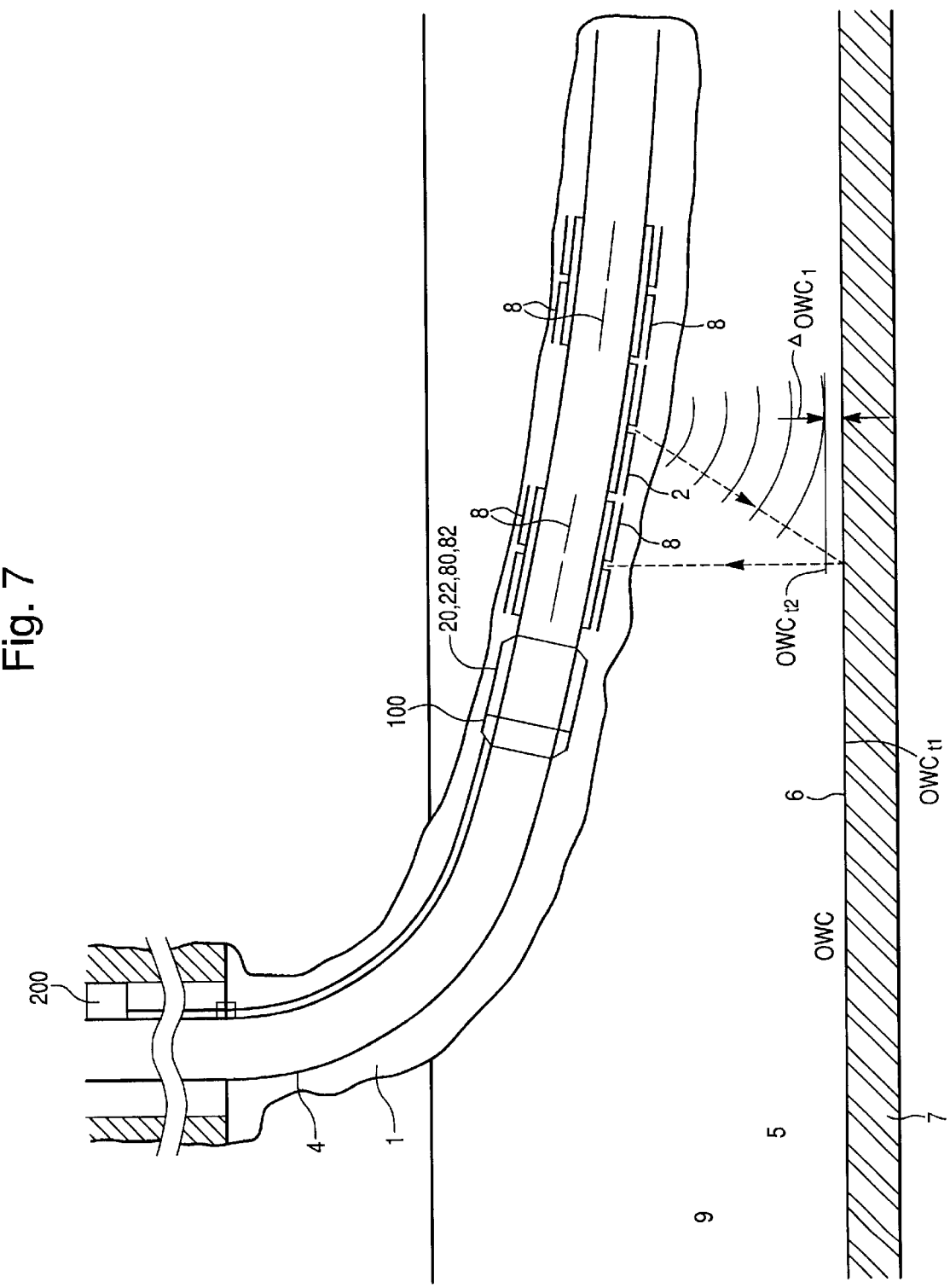
FIG. 7 and FIG. 8 display an application of a preferred embodiment of the invention for detecting changes of the distance between the radar and several sections of an oil/water contact.

A preferred embodiment of the invention is a method for radar detection in a well 1 in a geological formation 9. The method comprises the following steps, with reference to FIGS. 2, 7, and 10:

i) positioning at least one transmitter antenna 2 in a fixed position and attitude in the well 1 with respect to the geological formation 9. (The fixation may be performed by means of arranging the transmitter antenna 2 on the outer side of a pipe string 4, e.g. a production tubing 4 or an injection tube 4 and guide the tubing string 4 down into the well 1, and thereafter cement the tubing string 4 by ordinary injection of cement in the annulus. In a preferred embodiment of the invention the transmitter antenna is arranged on modules 8' as shown in FIGS. 2b and c, a feature which will be described in more detail below.)

ii) Generating a first series of electrical signals 25 to a transmitter antenna 2 and emission of a first series of electromagnetic waves $26_1$ from the transmitter antenna 2 at a first point of time $t_1$. A preferred embodiment of the transmitter antenna 2 is a dipole antenna as shown in FIGS. 2 and 7.

iii) Receiving a first series of reflected electromagnetic waves $(85_1, 85_2, \ldots, 85_n)$ in at least one, preferably several receiver antennas $(8_1, 8_2, \ldots, 8_n)$, and transformation of the first series of reflected electromagnetic waves to registrations $S_1$, with the registrations preferably being digitized. The receiver antennas 8 are also in the preferred embodiment dipole antennas.

iv) Generating a second series of electrical signals 25 to the transmitter antenna 2 and emission of a second series of electromagnetic waves 262 from the transmitter antenna 2, still in the same position and attitude in the well 1, at a later point of time $t_2$, with the time difference $t_2-t_1$ typically being several hours, days or longer time.

v) Receiving a second series of reflected electromagnetic waves $(85_1, 85_2, \ldots, 85_n)$ by the receiver antennas $(8_1, 8_2, \ldots, 8_n)$, and transformation of the second series of reflected electromagnetic waves to registrations $S_2$, with the registrations preferably being digitized.

Figure 8:
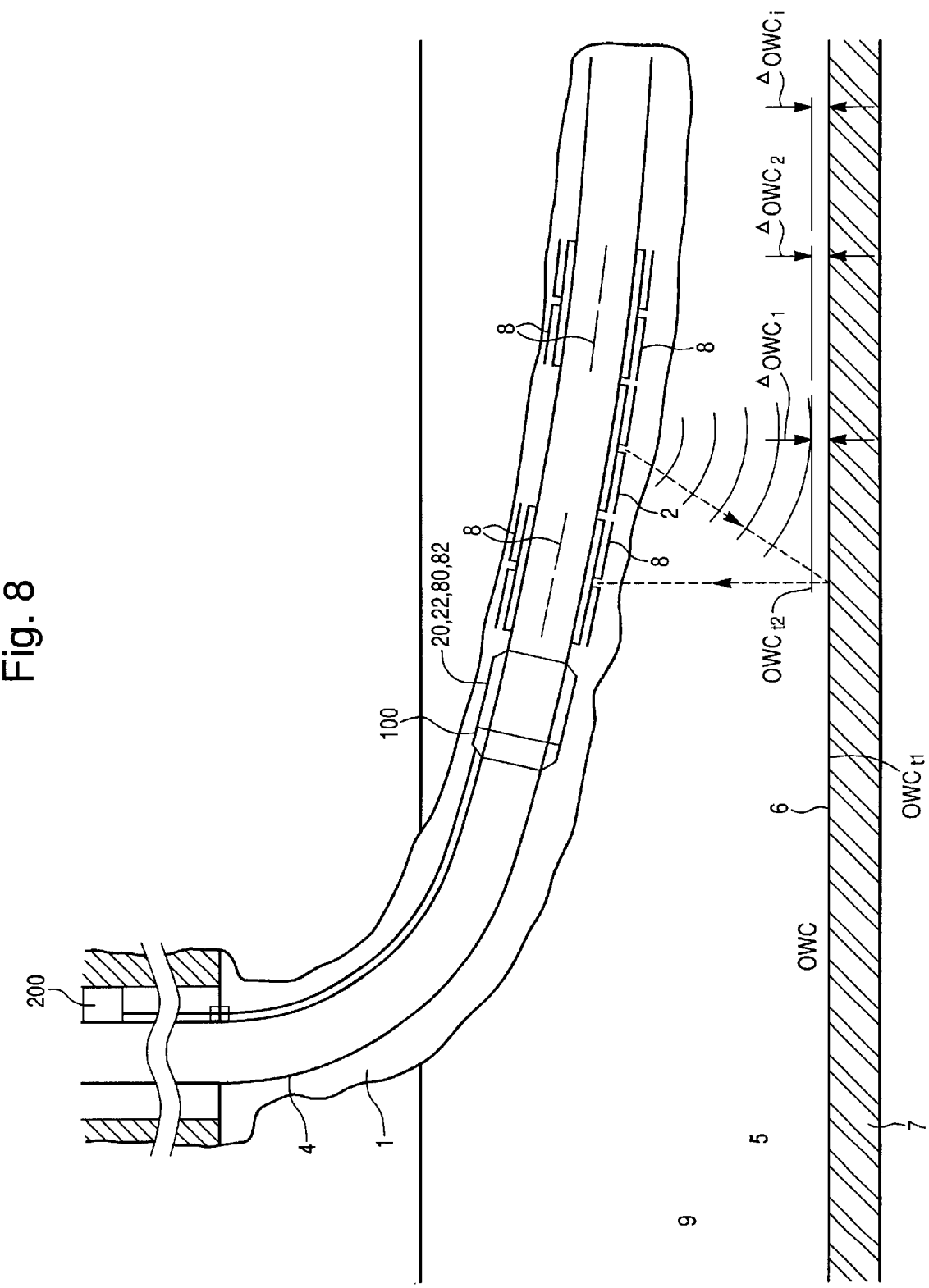
Figure 9:
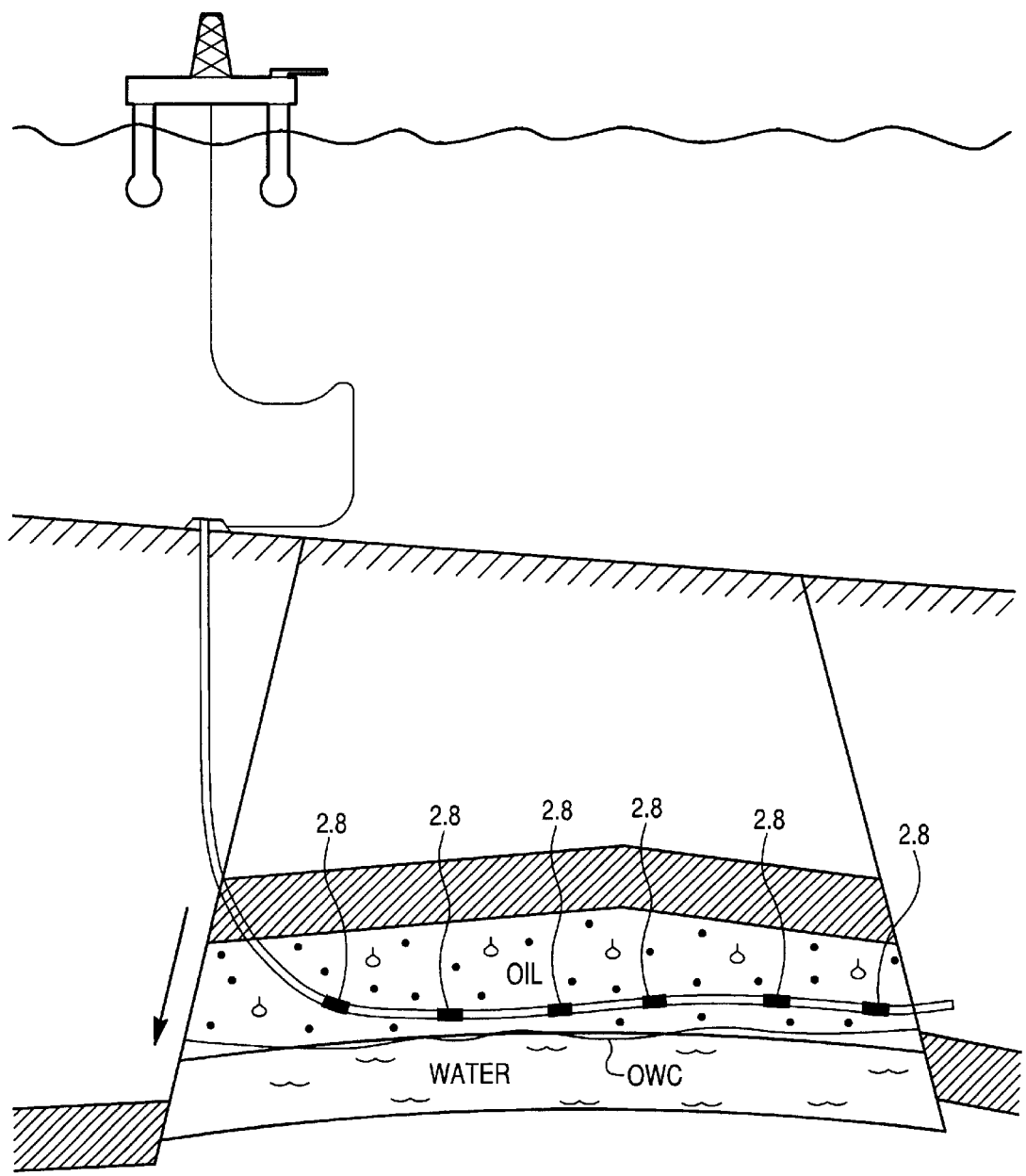
FIG. 9 is a large-perspective illustration of a well with corresponding surface arrangement, with the well comprising transmitter and receiver antennas in a horizontal production zone with varying distance to the oil/water contact.

In a preferred embodiment of the invention the method comprises the additional following steps:

vi) Forming a difference $D_{t2-t1}$ by subtraction of the registrations $S_1$ from the registrations $S_2$. If the registrations are digital this is an especially useful method.

vii) Interpreting the difference $D_{t2-t1}$ as the distance and possibly a direction to a horizon with a change of electrical properties between the points of time $t_1$ and $t_2$. Determination of the direction will be made possible by means of details by the method and the device as explained below. The distance is interpreted from two-way travel time (not the difference $D_{t2-t1}$) between the transmitter antenna 2, the expected reflector and the receiver antenna 8, with transit speed e.g. interpreted from FIG. 5d which gives group velocities for different frequencies. The interpretation of the difference $D_{t2-t1}$ is performed by searching for changes in resistivity which may represent a displacement of a liquid horizon, e.g. an oil/water contact OWC. The result of such a determination of a displacement distance of OWC is illustrated in the FIGS. 7 and 8. In the invention it is expected that it will be only liquids which displace themselves during the time between the registrations $S_1$ and $S_2$, but there is a possibility that solid particles also may have been removed, e.g. by production of loose sand particles from the well, or by deposition of clay minerals in the pore spaces in the geological formation 9. These effects may complicate the interpretation of the registrations $S_i$, but the invention may also be applied for registering such change in the rocks.

Figure 6A:
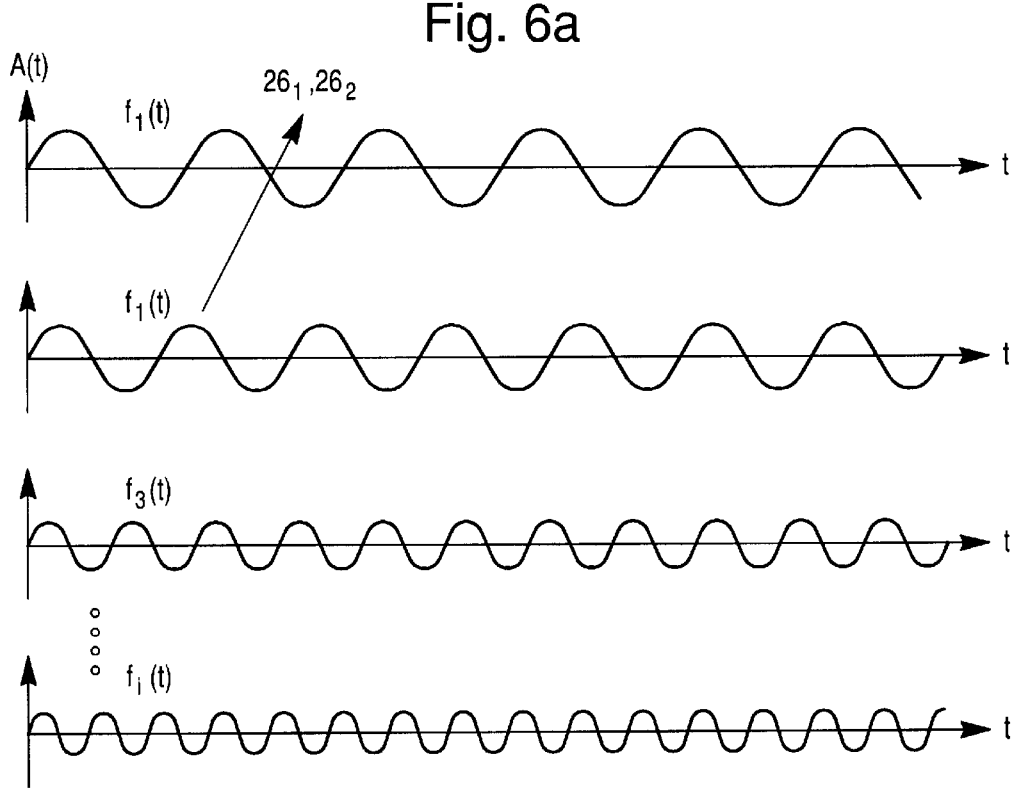
FIG. 6a displays graphs of emitted electromagnetic waves' amplitude with respect to the delayed time since the start of the emission.

In FIG. 6a is illustrated a preferred embodiment of the method according to the invention. Emission of coherent continuous electromagnetic waves $26_i$ is made, from the transmitter antenna 2. The advantage of this embodiment is that at each instant during the emission, only a single frequency is emitted, which insures that the electromagnetic waves propagate at one single speed. By ordinary radars, pulses are emitted which, according to wave theories, e.g. Fourier analysis, will have an infinite number of frequencies within a wide band of frequencies. The shorter the pulse, the wider frequency band the pulse contains.

Figure 6B:
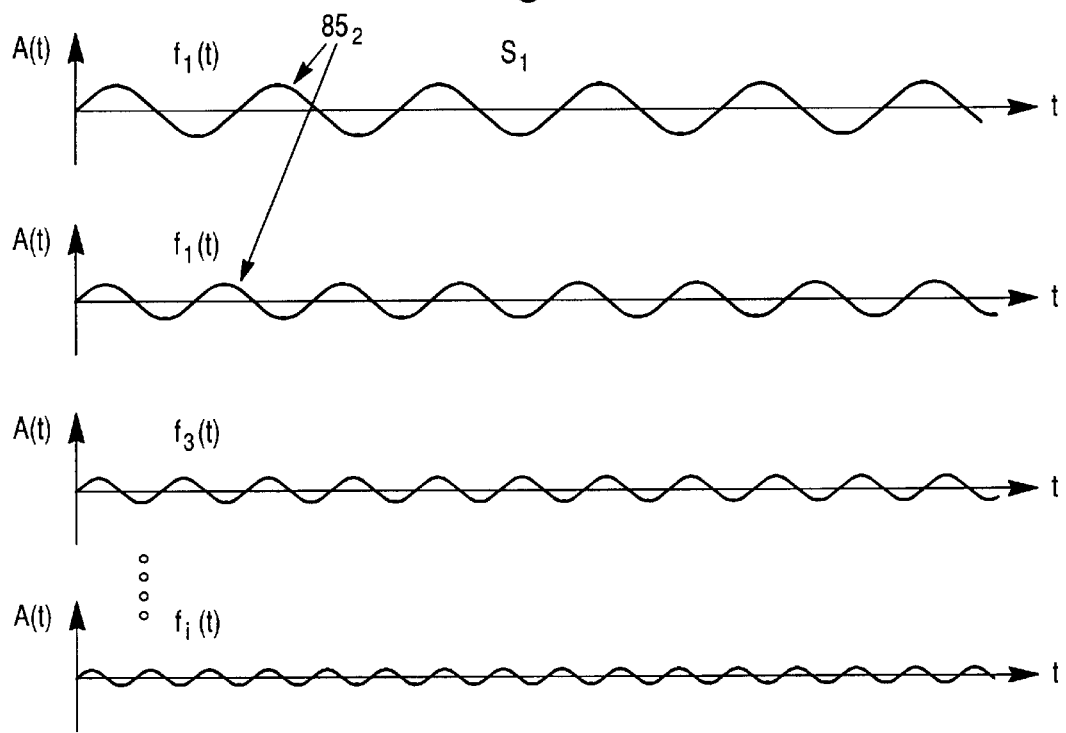
FIG. 6b displays corresponding graphs of received electromagnetic signals at receiver antennas. The signals are reduced in amplitude, and phase displaced with respect to the emitted signals.

A most preferred embodiment of the method according to the invention is shown in FIG. 6a, and comprises emission of coherent continuous electromagnetic waves $26_1$, $26_2$ stepwise ("stepped"), by a number of i different frequencies $f_1, f_2, \ldots, f_i$ from the transmitter antenna 2. In this way one may in a real way build up a frequency spectrum covering discrete frequencies $f_1, f_2, \ldots, f_i$ being emitted into the geological formations 9. Each of the electromagnetic wavetrains will propagate through the medium each with their discrete velocity. FIG. 6b illustrates that a part of the reflected energy is received as reflected waves ($85_1, 85_2, \ldots, 85_n$) by the receiver antennas ($8_1, 8_2, \ldots, 8_n$), where they are transformed to preferably electrical voltage signals which may be amplified and digitized and represented by registrations S. In an alternative embodiment of the invention, the reflected waves ($85_1, 85_2, \ldots, 85_n$) may be transformed to optical signals at a selected stadium, possibly already in the antennas.

In a preferred embodiment of the method according to the invention it is very advantageous to perform impedance adjustment of the transmitter antenna 2 for each one of the discrete emitted frequencies ($f_1, f_2, \ldots, f_i$), for maximum power emission to the geological formation 9. This is because the transmitter antennas 2 Q-factor changes drastically by change of frequency when the transmitter antenna 2 is situated only a few centimeters from the metallic tubing string's 4 surface. (If the transmitter antenna 2 is not tuned for maximum emission of electromagnetic energy to the geological formation 9, large parts of the energy will travel like an electromagnetic wave along the tubing string 4, almost like a signal along a core of a coaxial cable, with the rocks around the tubing string playing the role of the coaxial cable's dielectric.) A physical adaptation of the dipole antenna's length may happen via electronic switches which connects or disconnects more remote sections of the antenna in order for it to correspond to a quarter wavelength in the medium, and with the tuning of the antenna supplemented by tuning of the capacity of the resonance circuit by feedback connection.

Figure 5E:
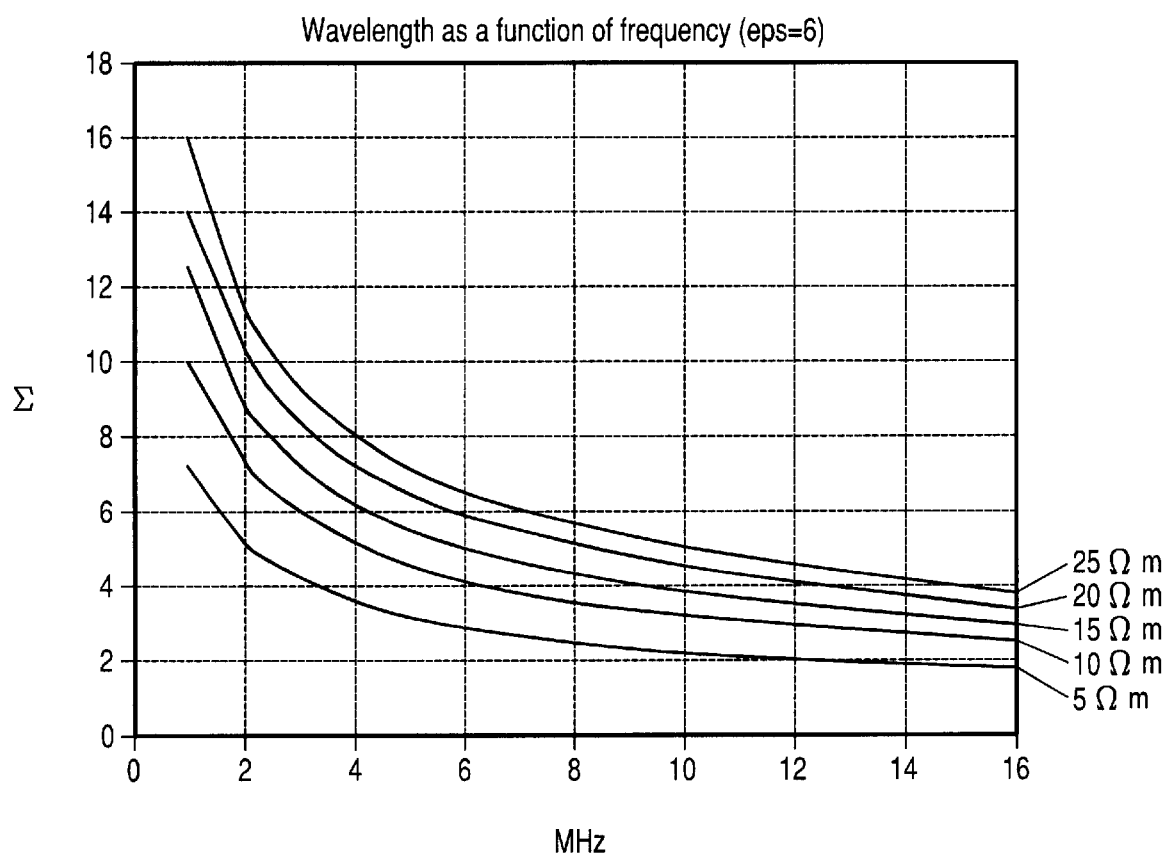
FIG. 5e displays graphs of wavelength as a function of frequency between 1 and 16 MHz for resistivities varying between 5 m and 25 m.

A corresponding impedance adjustment of the receiver antennas 8 must be performed for each of the particular emitted discrete frequencies ($f_1, f_2, \ldots, f_i$), for maximum reception of power from reflected electromagnetic waves from the geological formation 9. An image of the needed antenna lengths is obtained by studying FIG. 5e which displays wavelengths as a function of frequency inside the range between 1 and 16 MHz.

Some direct coupling always occurs of the emitted wave from the transmitter antenna 2 to the receiver antenna 8. Cancellation of direct waves or directly coupled signals between the transmitter antenna 2 and the receiver antenna 8 should be made, such that the direct wave interferes minimally with the reflected waves from the geological formation 9. This may according to an embodiment of the invention take place e.g. by a differential coupling between receiver antennas 8, possibly a relative differential coupling between the signal from the receiver antenna 8 and a relatively attenuated part of the voltage signal 25 to the transmitter antenna 2. (In an alternative embodiment of the invention with pulsed waves being applied there is a possibility for cancelling of the direct wave by avoiding sampling the signal from the receiver antennas for a short time during and after the emission of electromagnetic waves 26 from the transmitter antenna 2, so that the direct wave will pass. The technique of sampling in time windows may also compensate for unwanted signals from very close or strong reflectors shadowing remote-lying more interesting reflectors. However, the windowing technique is only advantageous during pulsed signal emission, whose disadvantages are explained above.) During emission of continuous waves with duration comparable with two-way transit time to the reflector, a differential coupling between the receiver antennas should be made.

Signal processing of the received electromagnetic waves ($85_1, 85_2, \ldots, 85_n$) or the registrations $S_1$ or $S_2$ is needed in order to detect changes in the electrical properties, preferably resistivity, in the geological formation 9.

Figure 6C:
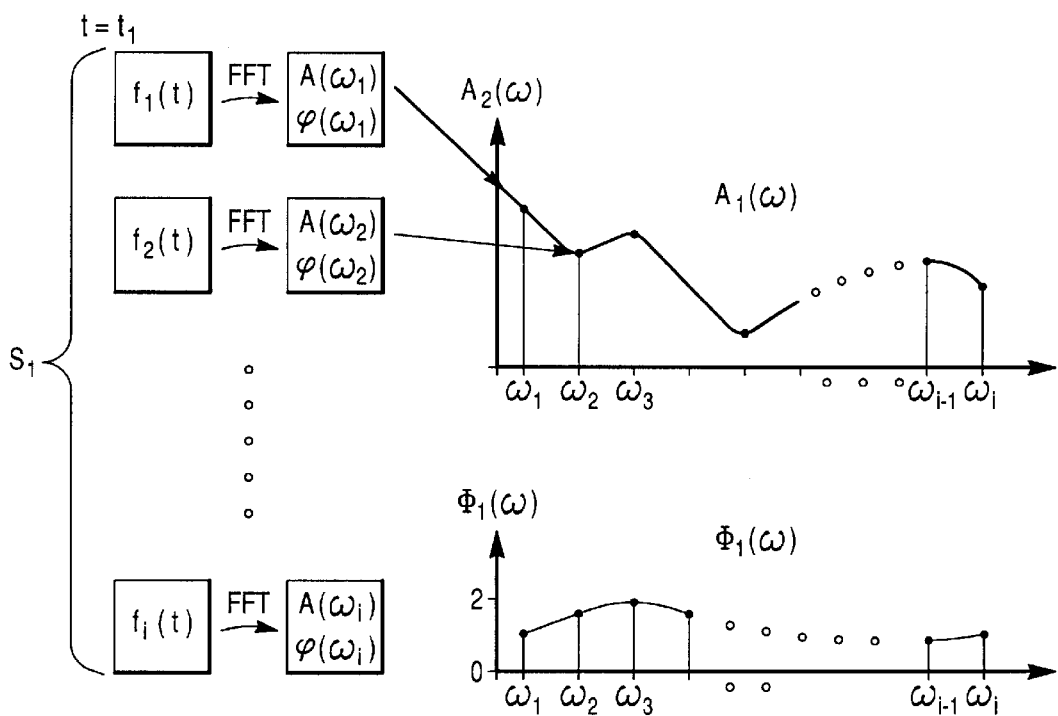
FIGS. 6c and 6d describe schematically a part of a method according to a preferred embodiment of the invention, with formation of frequency spectra of the registered signals from reflectors.
Figure 6D:
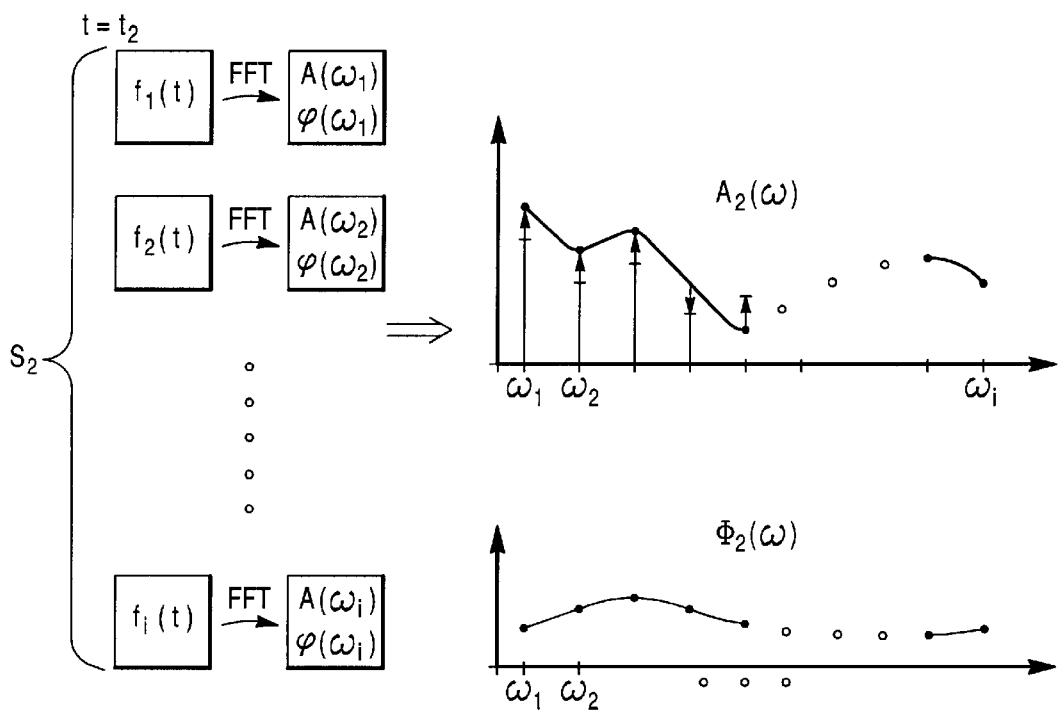
Figure 6E:
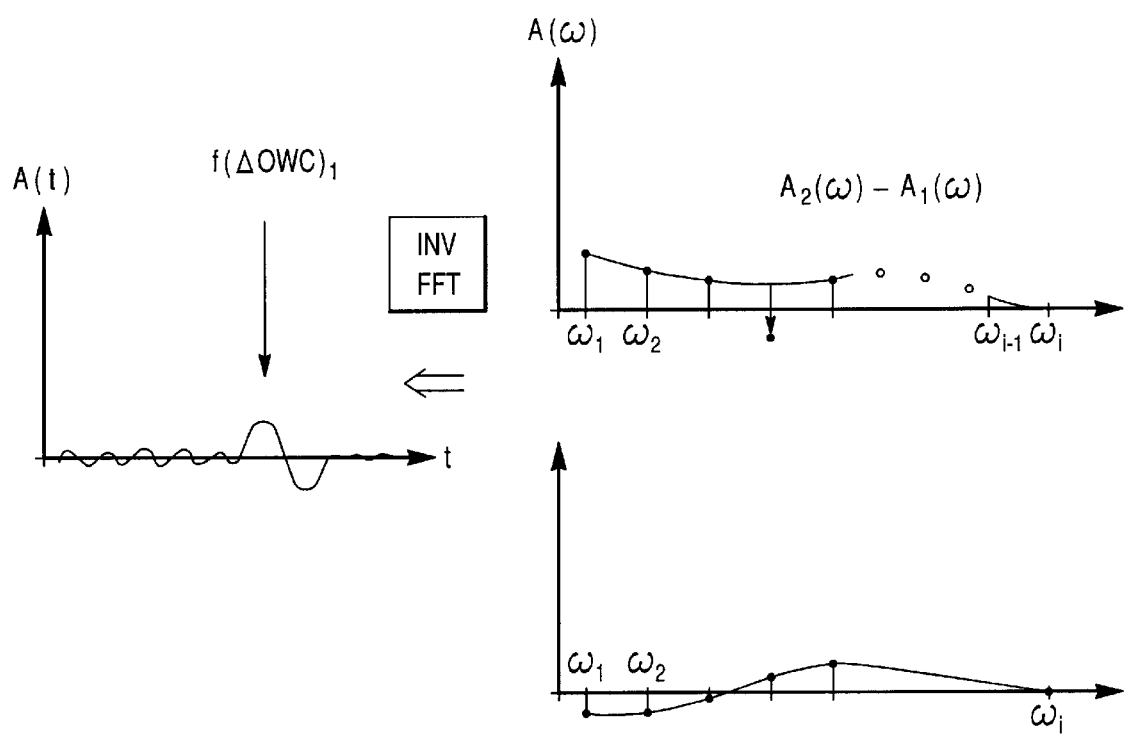
FIG. 6e describes schematically a part of a method according to a preferred embodiment of the invention, with formation of an artificial time-distance measurement to a reflector.

In a preferred embodiment of the invention, signal processing of the received electromagnetic waves ($85_1, 85_2, \ldots, 85_n$) or the registrations $S_1$ or $S_2$ is performed in order to detect changes in the electrical properties, preferably resistivity, in the geological formation 9 between two points in time $t_1$ and $t_2$. FIGS. 6c, 6d and 6e display an example of such a signal processing of time series representing the reflected signals ($85_1, 85_2, \ldots, 85_n$) or the registrations $S_1$ or $S_2$. In an embodiment of the method shown in FIG. 6c and FIG. 6d, at least one discrete Fourier frequency spectrum is determined for at least two of the parameters amplitude $A(\omega)$, phase $f(\omega)$, amplitude of the real part $Re(\omega)$, amplitude of the imaginary part $Im(\omega)$, where $\omega$ corresponds to the frequencies ($f_1, f_2, \ldots, f_i$) which were emitted from the transmitter antenna 2.

By emission of continuous coherent electromagnetic waves it is possible to perform a direct stepwise sampling of signals with amplitude $A(\omega)$, phase $f(\omega)$ of the electromagnetic waves ($85_1, 85_2, \ldots, 85_n$) from the receiver antennas 8 in the frequency domain at the frequencies ($f_1, f_2, \ldots, f_i$). Thus a simplified registration of the electromagnetic waves ($85_1, 85_2, \ldots, 85_n$) may be performed by essentially registering the amplitude and phase of the incoming wavetrain for each frequency $f_1, f_2, \ldots, f_i$. This requires less equipment than e.g. a discretely sampled digitizing of $f_i(t)$. Thus the step illustrated in the left part of FIGS. 6c and 6d, represented by sampling of $f_1(t), f_2(t), \ldots, f_i(t)$, together with the fast Fourier transform, is omitted in this simplified example, where one starts directly with measurement of amplitude $A(\omega)$, phase $f(\omega)$ for each particular frequency. One embodiment of the invention comprises signal processing of an inverse Fourier transform $F(\omega) \rightarrow f(t)$ by inverse Fourier transforming at least two of the parameters amplitude $A(\omega)$, phase $f(\omega)$, amplitude of the real part $Re(\omega)$, amplitude of the imaginary part $Im(\omega)$, with $\omega$ comprising essentially the frequencies $f_1, f_2, \ldots, f_i$, which were emitted from the transmitter antenna 2, and formation of a time series $f(t)$ which may represent pseudo-reflexes formed by electric resistivity gradients in the geological formation 9.

In a preferred embodiment of the invention there is performed an arrangement of a directionally sensitive antenna group 8' comprising three or more receiver antennas 8 around the tubing string's 4 axis and essentially at the same longitudinal positions on the tubing string 4, with the purpose of detecting the direction of electromagnetic waves ($85_1, 85_2, \ldots, 85_n$) and their reflectors' direction with respect to the tubing string's 4 axis. By combining reception of signals from receiver antennas 8 arranged at different angles, one may by combination of the received electromagnetic waves ($85_1, 85_2, \ldots, 85_n$), possibly by direct physical connection between receiver antennas 8 arranged in a directionally sensitive antenna group 8', calculate a reflector's angle $\alpha$ with respect to the tubing string's 4 axis.

By a corresponding arrangement of a transmitter antenna group 2' comprising two or more transmitter antennas 2, in this case preferably dipole-shaped transmitter antennas 2, around the tubing string's 4 axis and essentially at the same position along the tubing string 4, one obtains emission of electromagnetic waves 26 with energy propagating generally in a selected direction with respect to the tubing string's 4 axis. Thus one may "illuminate" a selected part of the geological formation. In the combination of the application of a directionally sensitive receiver antenna group 8' and a transmitter antenna group 2' one may perform a tomographic calculation of the electrical properties in a plane P perpendicular to the tubing string 4. This is illustrated in FIG. 2.

By combining signals ($85_1, 85_2, \ldots, 85_n$) from several receiver-antenna groups 8' (or alternatively signals ($85_1, 85_2, \ldots, 85_n$) received after emission from several transmitter antenna groups 2') one may in addition calculate a reflector's angle β normal to the plane P. In an alternative embodiment of the invention, generation of electrical signals 25 for emission of pulsed electromagnetic signals 26 from the transmitter antenna 2 may be made.

The radar device and the system as a unit is believed to have a dynamic range of 170 dB, with dynamic range being defined as emitted power divided by the least possibly registered received power. The electromagnetic waves will become attenuated due to propagation attenuation and wave dispersion and additionally there will be a geometrical dispersal of the power. It is assumed that the device will have a signal analyser whose least detectable signal is—110 dBmw for IF (intermediate frequency filter bandwidth)=10 Hz and maximum input without saturation is 20 dBmw. Thus the dynamic range for the signal analyser is 130 dB for IF=10 Hz. By reducing the IF-bandwidth (and by using continuous coherent waves) the dynamic range may be increased. The cost of this increased dynamic range is that the time used for signal reception will also increase. However one will have lots of time available for signal emission and reception whiles performing measurements to observe a change of the OWC. By selecting IF=0.1 Hz the least detectable signal becomes less than −130 dBmw and the signal analyser's dynamic range becomes 150 dB. Assuming that the applied power is 20 dB more than the coupled power, the emitted power in the system according to an embodiment of the invention is 170 dB more than the smallest detectable power. Emitted transmitter power is 10 W when the antenna efficiency is 1. Less antenna efficiency may be compensated for with higher transmitter power.

Assumigng that the receiver area A=1 m² (for a dipole antenna of length 1 m) and R=20 Ωm, the geometrical dispersion is thus will be 47 dB at distance of 30 m. If we assume the dynamic range=170 dB, geometric dispersion at a distance of 30 m to be 50 dB, reflection loss of 40 dB, then 80 dB remains for propagation loss. For a zone of resistivity R=500 Ωm the propagation loss is approximately 1.2 dB/m. Thus the detection range may be calculated as 0.5/(80/1.2) >30 meters. Directivity of the antennas will increase the detection range.

According to a preferred embodiment of the invention, there is provided a device for accomplishing the methods of the invention. The device is comprised as follows. At least one transmitter antenna 2 for emission of electromagnetic waves is fixedly arranged by the tubing string 4. The transmitter antenna 2 is configured to be mountable in a fixed position with respect to the geological formation. One or more receiver antennas 8 for electromagnetic waves is also arranged by the tubing string 4. The receiver antennas 8 are also configured to be mountable fixed positions with respect to the geological formation. The purpose of the fixed arrangement in the production zone is that measurements may be performed over some time interval if it is difficult to detect horizons by means of pulsed radar measurements. If the OWC has moved in the time between the measurements one may, by means of subtraction of the measurements, detect this change, and estimate the position of OWC.

The Radar in the Well

FIG. 2 illustrates a principle illustration of a possible embodiment of the invention, with transmitter antennas 2 and receiver antennas 8 arranged near a production tube 4. If the production tube 4 is metallic and electrically conductive, which is the present case, the antennas 2 and 8 must be arranged in the annulus between the production tube 4 and the geological formation 9. In a preferred embodiment of the invention the antennas 2 and 8 will be cemented in the annulus in the production zone in the formation 9, so that they are absolutely fixed in position and attitude. This absolute fixation of position and attitude leads to measuring- and analysis advantages which do not exist in the known art.

The fixed arrangement may be performed in several ways. The antenna may be fixed to the outer surface of the tubing string 4, and cemented rigidly to the formation by means of cement. In one preferred embodiment of the invention displayed in FIG. 6b, transmitter antennas 2 and receiver antennas 8 are arranged in unitary tubing string antenna modules 4' which may be threading screw joined and act as ordinary components in a tubing string 4 in a production well completion.

A preferred embodiment according to this invention will be applied in an almost horizontal well in a geological formation 9 as displayed in FIG. 1. FIG. 2 illustrates a device for detecting electrical properties, comprising at least one transmitter antenna 2 for emission of electromagnetic waves 26, mounted on or near a tubing string 4, with the transmitter antenna 2 is configured to be mounted in a fixed position with respect to the geological formation 9, at least one, preferably several receiver antennas 8 for receiving the reflected electromagnetic waves 26, on or near preferabily the same tubing string 4, with the receiver antennas 8 are configured to be mounted in a fixed position; and with respect to the geological formation 9. The receiver antennas 8 must be arranged close enough to the receiver antennas 2 that under the prevailing surrounding resistivities they may receive reflected electromagnetic waves.

In a preferred embodiment, a directionally sensitive antenna group 8' comprises three or more receiver antennas 8 arranged around the tubing string's 4 axis and essentially at the same position along the tubing string 4, configured to detect the reflected electromagnetic waves 26 and their reflectors, direction with respect to the tubing string's 4 axis. Such directionally sensitive antenna groups 8' are shown by two groups of dipole antennas 8, having one antenna group 8' arranged on either side of the illustrated transmitter antenna 2. In this way reflected electromagnetic waves received by several receiver antennas 8 at each antenna group 8' may be combined to calculate a direction a for the reflector in the plane P being perpendicular to the tubing string's 4 axis through the antenna group 8'. This is illustrated in FIG. 2. The combination of the signals may take place via physically connecting antenna signals in order to achieve differences, or combinations may be performed digitally after registering the waves. Phase differences between the incoming signals may also be used for finding the angle α. An angle β with respect to the normal plane P may be calculated by combining reflected electromagnetic signals received by at least two receiver antennas 8 positioned an equal distance from the transmitter antenna measured along the tubing string 4, and preferably on either side of the transmitter antenna 2. The angles α and β uniquely determine the direction to a reflector. A reflector's distance may be determined by estimating a two-way travel time for an electromagnetic pulse. In this way a reflector's position may be calculated with respect to the tubing string and its transmitter antennas 2 and receiving antennas 8.

In a similar manner, a preferred embodiment includes a transmitter antenna group 2' comprising two or more transmitter antennas 2 arranged around the axis of the tubing string 4 and essentially at the same position along the tubing string 4, configured to emit electromagnetic waves mainly in a selected direction with respect to the tubing string's 4 axis.

FIG. 2b illustrates a preferred embodiment of the invention incorporates transmitter antennas 2 and receiver antennas 8 combined in a tubing string module 4' comprising a transmitter antenna group 2' with at least two transmitter antennas 2 arranged at a first position along the tubing string antenna module 4', and at least one directionally sensitive antenna group 8' with at least three receiver antennas 8 arranged at a second position along the tubing string module 4'. A preferred embodiment of the tubing string antenna module 4' comprises a transmitter antenna group 2' with preferably two dipole-transmitter antennas 2 arranged on either side of the tubing string 4 by a first position along the tubing string antenna module 4', a first directionally sensitive antenna group 8' with preferably four dipole-receiver antennas 8 arranged with even angular separation around the tubing string 4 at by a second position along the tubing string antenna module 4', and a second directionally sensitive antenna group 8' with preferably four dipole-receiver antennas 8 arranged in the same manner at a third position along the tubing string antenna module 4', preferably at the opposite side of the transmitter antenna group 2' relative to the first directionally sensitive antenna group 8'.

FIG. 2c illustrates a perspective view of the tubing string antenna module 8'. The inner diameter will in the preferred embodiment be 4.9" and the metallic pipe 15 will have a diameter of 7". Ceramic isolators 6 are arranged outside on the metallic surface of the pipe 15. The ceramic isolators 6 constitute the base for transmitter antennas 2 and receiver antennas 8, respectively. In a preferred embodiment the isolators may be recessed in a cylinder-shaped recess in the metallic pipe 15. The entire side surface of the tubing string antenna module 8' is covered by a non-conductive coating in order to DC-isolate the electrical equipment from the well 1 and the geological formation 9. Centralizing devices are also arranged outside on each tubing string antenna module 4'. In a preferred embodiment the outer diameter for each centralizer is 9". This does not exclude other dimensions of the tubing string antenna module 4'. Electrical conductors 7 are provided for energy supply and communication along the tubing string module 4', with means for electrical coupling between two or more tubing string modules 4' internally and also with equipment in other locations, e.g. on the surface.

The tubing string antenna module 4' will usually constitute a part of a series of equal modules 4', together with other modular parts of a production tubing in a well completion string. The tubing string antenna module is arranged to preferably be cemented in a fixed position in the well. The module 4' and the electrical conductors 7 must be marked, e.g. magnetically, so they are not destroyed during perforation shooting of the production tube.

An electronics package 20 comprising necessary equipment to run the radar consists of a signal generator 22 for generation of electrical signals 25 to the transmitter antenna 2, devices 80 for receiving signals ($85_1, 85_2, \ldots, 85_n$) induced in each of the receiving antennas ($8_1, 8_2, \ldots, 8_n$) signal processing devices 82 for processing received signals ($85_1, 85_2, \ldots, 85_n$), and communication- and control devices 100 for emitting signals 105 which represent the electrical signals ($85_1, 85_2, \ldots, 85_n$), and for receiving control signals 205. The control signals and energy supply may in a preferred embodiment take place from a communication device 200 by the surface, via the electrical conductors 7.

In a preferred embodiment of the invention, the electronics package 20 is situated immediately in the vicinity of the antennas 2, 8. In an additionally preferred embodiment illustrated in FIG. 7 the tubing string antenna module 4' comprises the electronics package 20, and the electronics package 20 comprises (not shown) also an address unit 55, an accumulator- and charging unit 56, a memory 54 and a rest mode unit 57. The signal processing units 82 may be arranged for downhole processing of measured data. In the preferred embodiment each tubing string antenna module 4' will be addressable and selectively activated by the communication device 200. The accumulator- and charging unit 56 may store enough energy so sufficient energy can emitted out into the geological formations from the transmitter antennas 2 so that the receiver antennas 8 may register signals from reflectors. Due to power limitations of the energy- and communication conductors 7 the rest mode unit 57 is applied to engage different addressable electronics packages 20 with corresponding antennas 2, 8 at separate times, both with regard to charging, emission and processing.

In a preferred embodiment, the signal generator 22 for generation of electrical signals 25 to the transmitter antenna 2 will be configured to generate coherent continuous electromagnetic waves 26 from the transmitter antenna 2. Thus one may avoid dispersion of emitted electromagnetic signals due to varying group velocity as a function of the frequency. In an additionally preferred embodiment the signal generator 22 is arranged for generating electrical signals 25 to the transmitter antenna 2 for emission of coherent continuous electromagnetic waves by a number of i different frequencies $f_1, f_2, \ldots, f_i$ from the transmitter antenna 2.

An impedance regulating device 23 (not shown) configured to adapt the transmitter antenna's 2 impedance to each of the particular discrete emitted frequencies $f_1, f_2, \ldots, f_i$ is necessary. This impedance regulating device 23 may be an electronic switch in the dipole antennas 2 themselves. The electronic switch adjusts the dipole antennas 2 physical length. Alternatively, or as a supplement to switches on the antennas, one may perform tuning of the resonance circuits' capacitance by feedback coupling.

In a corresponding manner there is in the preferred embodiment arranged an impedance regulating device 83 (not shown) configured to adapt the receiver antenna's 8 impedance to each of the particular emitted discrete frequencies $f_1, f_2, \ldots, f_i$. In this way the transmitter antennas 2 and receiver antennas with corresponding impedance regulating devices 23, 83 are of very similar design.

In order to avoid direct coupling between the transmitter antenna 2 and the receiver antenna 8 cancelling devices 28 may be arranged for cancelling of direct waves or directly coupled signals between the transmitter antenna 2 and the receiver antenna 8. Differential coupling between receiver antennas 8, alternatively an attenuated differential coupling between a part of the electrical (e.g. voltage) signal to the transmitter antenna 2 and the receiver antenna 8 is one possible solution to cancel the emitted signal from the receiver antenna 8, particularly for embodiments employing emission of coherent continuous electromagnetic waves 26. For embodiments employing the emission of pulsed signals cancellation of direct waves or direct coupled signals between the transmitter antenna 2 and receiver antenna 8 may be performed by means of delaying the sampling at the receiver antenna 8 until the direct wave has passed. The control device 200 may be arranged preferably at the seabed or at the earth's surface, or at any other place.

The signal processing devices 82 for processing of the received signals ($85_1, 85_2, \ldots, 85_n$) comprise circuits or means arranged for forming at least one discrete Fourier frequency spectrum of at least two of the parameters amplitude $A(\omega)$, phase $f(\omega)$, amplitude of the real part $Re(\omega)$, amplitude of the imaginary part $Im(\omega)$, with $\omega$ comprising essentially those frequencies $(f_1, f_2, \ldots, f_i)$ which were emitted from the transmitter antenna 2.

In an alternative embodiment the signal generator 22 may be arranged for generation of pulsed electrical signals 25 to the transmitter antenna 2 as in the known art.

The radar may be applied for detecting the gradient in resistivity represented by the OWC situated below the approximately horizontal well. Due to sedimentary processes the chemical and physical parameters (mineral composition, density, resistivity, permeability) along the deposited layers are more constant than across the layers. Thus the resistivity logs displayed in FIG. 4 from the vertical wells represent typical resistivity variations which may exist between the horizontal well and the OWC below the well.

In a producing vertical well the OWC may, due to the pressure and flow conditions, form a vertical conical surface around the production well.

Water in such deep formations is usually more strongly electrically conductive, with resistivity below 1 $\Omega$m.

The present invention is applied in a preferred embodiment inside the oil zone in the reservoir rock. The resistivity in the oil zone may be between 150 and 1000 $\Omega$m. The transmitter antennas and the receiver antennas for the radar waves are arranged outside the metallic borehole string, which in a preferred embodiment is constituted by a production tube, but which in an alternative embodiment is constituted by a casing pipe, normally metallic. It is also possible to arrange the transmitter- and receiver antennas inside the casing pipe or production tubing if these pipes are made of non-conductive materials, e.g. composite materials.

The tubing string 4 may comprise a production tubing or a casing, or equivalent. The receiver antennas 8 and the transmitter antenna 2 are arranged outside of the surface of the metallic parts of the tubing string 4. If the tubing string 4 is made of composite materials which do not comprise metal or other electrically conductive materials, the antennas 8 and 2 may be inside or inside the wall of the tubing string 4.

It is also possible to fix the antennas 2 and 8 in other ways than by cementing. For emample, the borehole radar with the antennas 2 and 8 may be retractable and arranged with a guiding slot/guide fin in order to be reinserted in exactly the same position and orientation in the production zone at a later point of time after the first radar detection.

Figure 10B:
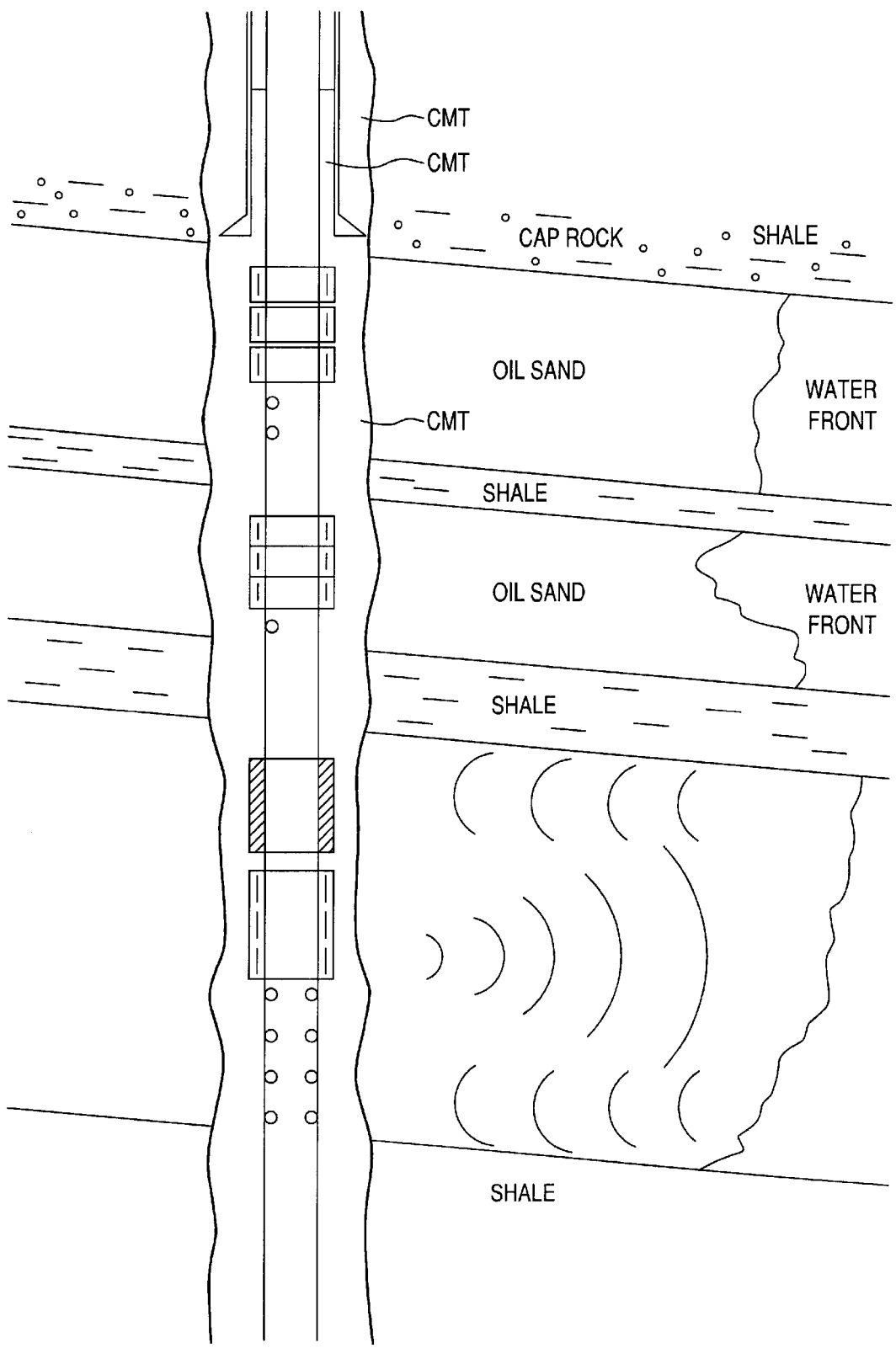
FIGS. 10b and 10c show illustrations of a device and a method according to the invention in an alternative application in a vertical well.
Figure 10C:
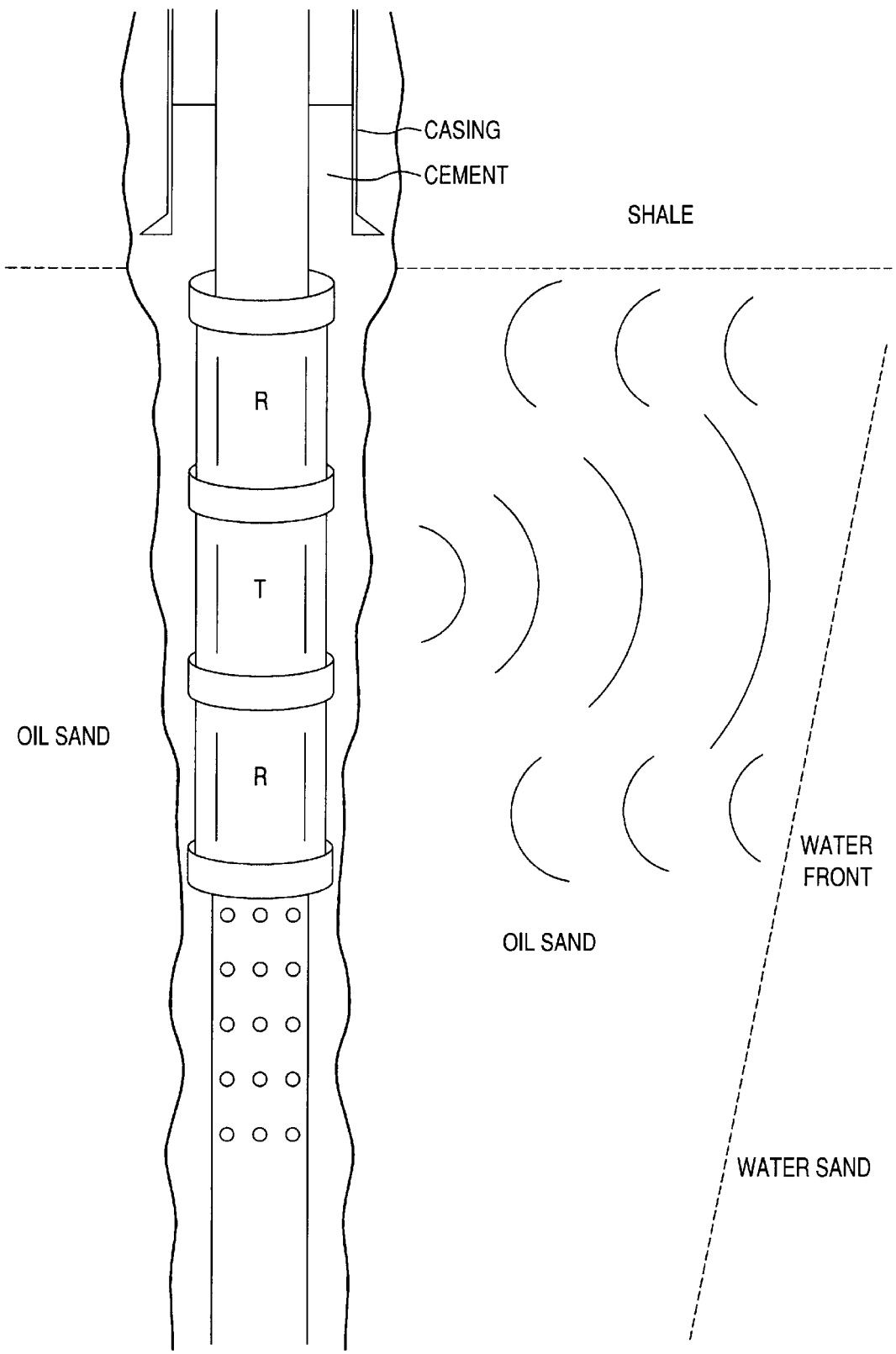

In an alternative embodiment of the invention it is employed in a vertical well. In FIGS. 10b and 10c is illustrated how several pressure isolated producing formations are approached at each their water front, and how the different water fronts are monitored by means of the invention.

We claim:

1. A method for detecting electrical properties in a geological formation via a well which has within it a tubing string, comprising the steps of:

mounting a transmitter antenna outside of the tubing string in the well in a fixed position with respect to the geological formation, the transmitter antenna being configured to emit electromagnetic waves;

mounting a receiver antenna outside of the tubing string in a fixed position with respect to the geological formation, the receiving antenna being configured to receive reflected electromagnetic waves;

generating a first series of electrical signals to cause the transmitter antenna to emit a first series of electromagnetic waves at a first time;

receiving a first series of reflected electromagnetic waves in the receiver antenna;

transforming the first series of reflected electromagnetic waves to form a first registration;

generating a second series of electrical signals to cause the transmitter antenna to emit a second series of electromagnetic waves at a second time;

receiving a second series of reflected electromagnetic waves in the receiver antenna;

transforming the second series of reflected electromagnetic waves to form a second registration; and determining electrical properties of the geological formation from the first registration, the second registration and known effects upon electromagnetic wave propagation of electrical properties of a geological formation.

2. The method according to claim 1, wherein the transmitter antenna comprises a plurality of transmitter antennas.

3. The method according to claim 1, wherein the receiver antenna comprises a plurality of receiver antennas.

4. The method according to claim 1, wherein the interval between the first time and the second time is several hours or days.

5. The method according to claim 1, further comprising the steps of:

forming a difference by subtracting the first registration from the second registration; and interpreting the difference as a distance to a horizon with a change in electrical properties between the first time and the second time.

6. The method according to claim 5, further comprising the step of interpreting the difference as a direction to a horizon with a change in electrical properties between the first time and the second time.

7. The method according to claim 1, wherein the difference is interpreted as a displacement of a liquid horizon.

8. The method according to claim 1, wherein the emitted first and second series of electromagnetic waves are coherent continuous electromagnetic waves.

9. The method according to claim 8, wherein the emitted coherent continuous electromagnetic waves are emitted at a plurality of discrete frequencies.

10. The method according to claim 9, wherein the transmitter antenna has an impedance, and further comprising the step of adjusting the impedance of the transmitter antenna to each of the discrete frequencies of the emitted coherent continuous electromagnetic waves to maximize power emission to the geophysical formation.

11. The method according to claim 9, wherein the receiver antenna has an impedance, and further comprising the step of adjusting the impedance of the receiver antenna to each of the discrete frequencies of the emitted coherent continuous electromagnetic waves to maximize received power of reflected electromagnetic waves.

12. The method according to claim 1, further comprising the step of canceling emitted electromagnetic waves in the receiver antenna so that the emitted electromagnetic waves interfere minimally with reflected electromagnetic waves.

13. The method according to claim 12, wherein the step of canceling emitted electromagnetic waves in the receiver antenna is accomplished by a relative differential coupling between the signal from the receiver antenna and a relatively attenuated part of the first and second series of electrical signals to the transmitter antenna.

14. The method according to claim 3, further comprising the step of canceling emitted electromagnetic waves in the receiver antennas so that the emitted electromagnetic waves interfere minimally with reflected electromagnetic waves accomplished by a differential coupling between the receiver antennas.

15. The method according to claim 1, further comprising the step of processing the first and second series of received electromagnetic waves, or the first and second registrations to detect gradients in electrical properties.

16. The method according to claim 1, further comprising the step of processing the first and second series of received electromagnetic waves or the first and second registrations to detect a change in gradients in electrical properties between the first time and the second time.

17. The method according to claim 9 further comprising the step of processing a time series of received reflected electromagnetic waves or a time series of the registrations to form at least one discrete Fourier frequency spectrum of at least two of the parameters amplitude $A(\omega)$, phase $\phi(\omega)$, amplitude of the real part $Re(\omega)$, and amplitude of the imaginary part $Im(\omega)$, with $\omega$ corresponding to the frequencies of electromagnetic waves emitted from the transmitter antenna.

18. The method according to claim 9, further comprising the step of conducting a direct stepwise sampling of the received reflected electromagnetic waves with amplitude $A(\omega)$ and phase $\phi(\omega)$ in the frequency domain with $\omega$ corresponding to the frequencies of electromagnetic waves emitted from the transmission antenna.

19. The method according to claim 9, further comprising the steps of:
  performing an inverse Fourier transform on at least two of the parameters amplitude $A(\omega)$, phase $\phi(\omega)$, amplitude of the real part $Re(\omega)$, and amplitude of the imaginary part $Im(\omega)$, with $\omega$ corresponding to the frequencies of electromagnetic waves emitted from the transmitter antenna; and
  forming a time series of frequency as a function of time to represent pseudoreflexes formed by electromagnetic impedance gradients in the geological formation.

20. The method according to claim 1, wherein the tubing string has a centerline axis and a length axis, and wherein the step of mounting a receiver antenna comprises mounting on a tubing string a directionally sensitive antenna group, comprising three or more receiver antennas, the three or more receiver antennas being positioned about the centerline axis at essentially the same position along the length of the tubing string, the directionally sensitive antenna group being configured to detect the direction of electromagnetic waves and thereby detect the direction to electromagnetic wave reflectors with respect to the centerline axis of the tubing string.

21. The method according to claim 1, wherein the tubing string has a centerline axis and a length, and wherein the step of mounting a transmitter antenna comprises mounting a transmitter antenna group comprising two or more receiver antennas, the two or more receiver antennas being positioned about the centerline axis at essentially the same position along the length of the tubing string, the transmitter antenna group being configured to be capable of directing electromagnetic waves generally in a selected direction with respect to the centerline axis of the tubing string.

22. The method according to claim 1, wherein the step of generating electrical signals cause the transmission antenna to emit pulsed electromagnetic signals.

23. A device for detecting electrical properties in a geological formation via a well containing a tubing string with a centerline axis and a length, comprising:

a transmitter antenna for emitting electromagnetic waves, the transmitter antenna being configured to be positioned near the tubing string and mounted in a fixed position with respect to the geological formation; and
  a directionally sensitive receiver antenna group for receiving reflected electromagnetic waves, the directionally sensitive receiver antenna group being configured to be positioned near the tubing string and mounted in a fixed position with respect to the geological formation and to be capable of detecting the direction of reflected electromagnetic waves and the direction to electromagnetic wave reflectors with respect to the center line axis of the tubing string.

24. A device according to claim 23, wherein the directionally sensitive receiver antenna group comprises three or more receiver antennas configured to be positioned about the center line axis at essentially the same position along the length of the tubing string.

25. A device according to claim 23, wherein the transmitter antenna comprises a transmitter antenna group comprising two or more transmitter antennas configured to be positioned about the center line axis at essentially the same position along the length of the tubing string, the transmitter antenna group configured to be capable of emitting electromagnetic waves generally in a selected direction with respect to the center line axis of the tubing string.

26. A device according to claim 23, further comprising a tubing string antenna module having a length configured to be positioned in a fixed arrangement in a well, the tubing string antenna module comprising:
  a transmitter antenna group with at least two transmitter antennas fixed at a first position along the length of the tubing string antenna module; and
  at least one directionally sensitive receiver antenna group with at least three receiver antennas fixed at a second position along the length of the tubing string antenna module.

27. A device according to claim 26, wherein the tubing string antenna module has a centerline axis and a length, and the tubing string antenna module further comprises:
  a transmitter antenna group with two dipole transmitter antennas positioned on either side of the tubing string module at a first position along the length of the tubing string module;
  a first directionally sensitive receiver antenna group with four dipole receiver antennas positioned with even angular separation about the tubing string antenna module at a second position along the length of the tubing string antenna module; and
  a second directionally sensitive receiver antenna group with four dipole receiver antennas positioned at even angular separation about the tubing string antenna module at a third position along the length of the tubing string antenna modules.

28. A device according to claim 27 wherein the transmitter antenna group is positioned between the first directionally sensitive receiver antenna group and the second directionally sensitive receiver antenna group along the length of the tubing string antenna module.

29. A device according to claim 27, further comprising an electronics package, the electronics package comprising:
  a signal generator for generating electrical signals to the transmitter antennas;
  devices for receiving signals induced in each receiver antenna;
  signal processing devices for processing the received signals to generate a processed signal output; and communication devices for transmitting signals representing the processed signal output, and for receiving control signals.

30. A device according to claim 27, wherein the signal generator is configured to generate electrical signals to cause the transmitter antenna to emit coherent continuous electromagnetic waves.

31. A device according to claim 30, wherein the signal generator is configured to generate electrical signals to cause the transmitter antenna to emit coherent continuous electromagnetic waves at a plurality of discrete frequencies.

32. A device according to claim 31, wherein the transmitter antenna has an impedance, and further comprising an impedance adjustment device configured to be able to adapt the transmitter antennas impedance to each of the discrete frequencies of emitted coherent continuous electromagnetic waves to maximize power emission into the geological formation.

33. A device according to claim 31, wherein the receiver antenna has an impedance, and further comprising an impedance adjustment device configured to adapt the receiver antenna impedance for each of the discrete frequencies of emitted coherent continuous electromagnetic waves to maximize received power of reflected electromagnetic waves.

34. A device according to claim 23, further comprising a canceling device configured to cancel in the receiver antenna emitted electromagnetic waves from the transmitter antenna.

35. A device according to claim 34, wherein the canceling device cancels in the receiver antenna electromagnetic waves emitted by the transmitter antenna by differential coupling between the transmitter antenna and the receiver antenna.

36. A device according to claim 29, wherein the electronics package is capable of being positioned near the transmitter antenna or the receiver antenna.

37. A device according to claim 29, wherein the electronics package is assembled in the tubing string antenna module.

38. A device according to claim 37, wherein the electronics package further comprises an address unit, an accumulator and charging unit, and a memory and rest mode unit.

39. A device according to claim 38, further comprising a control device, and an electrical energy supply and communication line electrically coupled between the communication unit in the electronics package and the control device.

40. A device according to claim 39, wherein the control device is capable of being placed at the sea bottom or at the earth's surface.

41. A device according to claim 31, wherein the signal processing devices are configured to be capable of processing received signals to form at least one discrete Fourier frequency spectrum of at least two of the parameters Amplitude $A(\omega)$, phase $\phi(\omega)$, amplitude of the real part $Re(\omega)$, and amplitude of the imaginary part $Im(\omega)$, with $(\omega)$ comprising essentially the discrete frequencies of electromagnetic waves emitted by the transmitter antenna.

42. The device according to claim 29, wherein the signal generator is configured to cause the transmitter to emit pulsed electromagnetic waves.

43. A device according to claim 42, wherein the canceling in the receiver antenna of electromagnetic waves emitted by the transmitter antenna is accomplished by delayed sampling of electromagnetic waves by the receiver antenna.

44. A system for detecting electrical properties in a geological formation via a well in which has been place a tubing string having a centerline axis, comprising:

a transmitter antenna configured to be capable of emitting electromagnetic waves, the transmitter antenna configured to be capable of being fixedly positioned near the tubing string with respect to the geological formation;

a signal generator configured to generate electrical signals to cause the transmitter antenna to emit electromagnetic waves;

a directionally sensitive receiver antenna for receiving reflected electromagnetic waves, the receiver antenna configured to be fixedly positioned near the tubing string with respect to the geological formation and to be capable of detecting the direction of reflected electromagnetic waves and the direction to electromagnetic wave reflectors with respect to the centerline axis of the tubing string;

a device for receiving signals induced in the receiver antenna by reflected electromagnetic waves;

a signal processing device for processing the received signals; and a communication device for transmitting processed received signals and receiving control signals.

45. The system according to claim 44 further comprising:

a plurality of receiver antennas;

a plurality of devices for receiving signals induced in the receiver antennas, each different one of the plurality of devices connected to a different one of the plurality of receiver antennas; and a plurality of signal processing devices for processing the receved signals, each different one of the plurality of signal processing devices connected to a different one of the plurality of devices for receiving signals.

* * * * *